US012738205B2

(12) United States Patent
Kim et al.

(10) Patent No.: US 12,738,205 B2
(45) Date of Patent: Sep. 15, 2026

(54) DISPLAY DEVICE

(71) Applicant: LG Display Co., Ltd., Seoul (KR)

(72) Inventors: Taekyun Kim, Paju-si (KR); Choonghoon Lee, Paju-si (KR); Sangil Shin, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/097,653

(22) Filed: Apr. 1, 2025

(65) Prior Publication Data

US 2026/0179532 A1 Jun. 25, 2026

(30) Foreign Application Priority Data

Dec. 24, 2024 (KR) ........................ 10-2024-0196003

(51) Int. Cl.
*G09G 3/32* (2016.01)

(52) U.S. Cl.
CPC ....... *G09G 3/32* (2013.01); *G09G 2300/0819* (2013.01); *G09G 2300/0842* (2013.01); *G09G 2310/0267* (2013.01); *G09G 2310/0286* (2013.01); *G09G 2310/08* (2013.01)

(58) Field of Classification Search
CPC ............. G09G 3/32; G09G 2300/0819; G09G 2300/0842; G09G 2310/0267; G09G 2310/0286; G09G 2310/08
See application file for complete search history.

(56) References Cited

U.S. PATENT DOCUMENTS 9,595,546 B2 * 3/2017 Kim ..................... G09G 3/3233
10,014,357 B2 * 7/2018 Seok ..................... H10K 50/11
10,490,136 B2 * 11/2019 Zhu ..................... G09G 3/3233
11,923,380 B2 * 3/2024 He ..................... H10D 86/0221
12,272,700 B2 * 4/2025 Yamazaki ............ H10D 86/423
2019/0081090 A1 * 3/2019 Lee ..................... H10D 86/411
2021/0408140 A1 * 12/2021 Han ................... G06V 40/1318
2023/0016214 A1 * 1/2023 Yamazaki ............ H10D 86/423
2024/0071286 A1 * 2/2024 Lee ..................... G09G 3/3233
2024/0099058 A1 3/2024 Choi et al.
2025/0279051 A1 * 9/2025 Yang .................... G09G 3/3233

FOREIGN PATENT DOCUMENTS

KR 10-2024-0029669 A 3/2024
KR 10-2024-0038333 A 3/2024

* cited by examiner

*Primary Examiner* — Nitin Patel
*Assistant Examiner* — Jennifer L Zubajlo
(74) *Attorney, Agent, or Firm* — Fenwick & West LLP

(57) ABSTRACT

A display device includes pixels in a display area and a driving unit in a non-display area, each pixel including a light-emitting element including light-emitting units connected in series through a common node, a driving transistor having a first electrode connected to a high-potential voltage line via a first node, a second electrode connected to a second node, and a gate electrode connected to the light-emitting element via a third node, a compensation transistor connected between the second and third nodes, with a gate electrode that receives a first scan signal, a switching transistor connected between a data line and the first node, with a gate electrode that receives a second scan signal, an anode reset transistor connected between the light-emitting element and an anode reset voltage line, with a gate electrode that receives a third scan signal, and a common node reset voltage line connected to the common node.

18 Claims, 12 Drawing Sheets

DISPLAY DEVICE

CROSS REFERENCE TO RELATED APPLICATION

The present application claims priority to Republic of Korea Patent Application No. 10-2024-0196003, filed on Dec. 24, 2024, which is hereby incorporated by reference in its entirety.

BACKGROUND

Field of Technology

The present disclosure relates to a display device.

Description of the Related Art

With the advancement of the information society, there is an increasing demand for display devices that can show images, and various types of display devices such as liquid crystal display (LCD) devices and organic light emitting diode (OLED) displays are being utilized.

These display devices comprise of multiple components, including a display panel, a data driver, a gate driver, a timing controller, and a power management unit. The power management unit generates and supplies various driving voltages required for the operation of these components using the input power.

SUMMARY

It is an object of the embodiments to provide a display device including a light-emitting element with a tandem structure having a plurality of light-emitting units, wherein, during an anode reset period within one frame, the voltage of a common node to which the light-emitting units are connected is reset.

It is another object of the embodiments to provide a display device that applies an anode reset voltage to a common node during an on-bias period.

It is another object of the embodiments to provide a display device including a connection transistor in a non-display area that electrically connects an anode reset voltage line and a common node reset voltage line.

It is another object of the embodiments to provide a display device in which, in a non-display area, a common node reset electrode is formed on the same layer as the anode electrode of a light-emitting element, and the common node reset electrode is brought into contact with an anode reset voltage line.

It is still another object of the embodiments to provide a hybrid-type pixel capable of minimizing or at least reducing current leakage using an oxide semiconductor transistor, a method of driving the pixel, and a display device including the pixel.

A display device according to an embodiment may include pixels arranged in a display area and at least one driving unit arranged in a non-display area surrounding the display area.

Each of the pixels may include a light-emitting element including a plurality of light-emitting units connected in series through a common node, a driving transistor, the driving transistor including a first electrode connected to a high-potential driving voltage line through a first node, a second electrode connected to a second node, and a gate electrode connected to an anode electrode of the light-emitting element through a third node, a compensation transistor connected between the second node and the third node, with a gate electrode configured to receive a first scan signal, a switching transistor connected between a data line and the first node, and having electrode configured to receive a second scan signal, an anode reset transistor connected between the light-emitting element and an anode reset voltage line, and having electrode configured to receive a third scan signal, and a common node reset voltage line connected to the common node.

The common node reset voltage line may be electrically connected to the anode reset voltage line through a connection transistor.

The connection transistor may be connected between the anode reset voltage line and the common node reset voltage line, and having electrode configured to receive the third scan signal.

When the third scan signal is applied at a turn-on level during an anode reset period within one frame, the anode reset transistor may be turned on and apply an anode reset voltage to the anode electrode, the connection transistor is turned on and electrically connect the anode reset voltage line and the common node reset voltage line, and the common node reset voltage line applies the anode reset voltage to the common node.

The connection transistor may be disposed in the non-display area.

The anode reset voltage line and the common node reset voltage line may be disposed between the at least one driving unit and the display area, and the connection transistor may be disposed in a connection area between the anode reset voltage line and the common node reset voltage line.

The common node reset voltage line may be formed in a closed-loop shape surrounding the display area, and the anode reset voltage line may be formed to surround at least three sides of the display area.

The light-emitting element may include a first electrode, a second electrode arranged opposite the first electrode, a first light-emitting unit and a second light-emitting unit disposed between the first electrode and the second electrode, and a charge generation layer interposed between the first light-emitting unit and the second light-emitting unit, constituting the common node.

Each of the pixels may further include an initialization transistor connected between an initialization voltage line and the second node, and having electrode configured to receive a fourth scan signal, a first light-emission transistor connected between the high-potential driving voltage line and the first node, and having electrode configured to receive a light-emission signal, a second light-emission transistor connected between the third node and the light-emitting element, and having electrode configured to receive the light-emission signal, an on-bias transistor connected between the first node and an on-bias voltage line, and having electrode configured to receive the second scan signal, and a storage capacitor connected between the high-potential driving voltage line and the second node.

The at least one driving unit may include a gate driver configured to output the first to fourth scan signals and the light-emission signal through corresponding scan lines and a light-emission line, respectively.

The gate driver may include a first shift register configured to output the first scan signal, a second shift register configured to output the second scan signal, a third shift register configured to output the third scan signal, a fourth shift register configured to output the fourth scan signal, and a fifth shift register configured to output the light-emission signal.

The second shift register may be disposed adjacent to the display area, and the first, third, fourth, and fifth shift registers may be sequentially disposed farther from the display area.

At least some of the driving transistor, the compensation transistor, and the anode reset transistor are low temperature poly-silicon (LTPS) transistors, and the remainder are oxide transistors.

The display device may further include a substrate, a first buffer layer disposed on the substrate, a first semiconductor layer of a first transistor disposed on the buffer layer, a first insulating layer disposed on the first semiconductor layer, a first gate electrode of the first transistor disposed on the first insulating layer, a second insulating layer disposed on the first gate electrode of the first transistor, a second buffer layer disposed on the second insulating layer, a second semiconductor layer of a second transistor disposed on the second buffer layer, a third insulating layer disposed on the second semiconductor layer, a second gate electrode of the second transistor disposed on the third insulating layer, a fourth insulating layer disposed on the second gate electrode of the second transistor, source and drain electrodes of the first and second transistors disposed on the fourth insulating layer, a protective film disposed on the source and drain electrodes, a planarization layer disposed on the protective film, an anode electrode of the light-emitting element disposed on the planarization layer, a first light-emitting unit of the light-emitting element disposed on the anode electrode, a charge generation layer of the light-emitting element disposed on the first light-emitting unit, constituting the common node, a second light-emitting unit of the light-emitting element disposed on the charge generation layer, and a cathode electrode of the light-emitting element disposed on the second light-emitting unit.

The first transistor may be one of the driving transistor, the compensation transistor, or the anode reset transistor, and the second transistor may be another of the driving transistor, the compensation transistor, or the anode reset transistor.

The display device may further include a connection transistor including a third semiconductor layer disposed on the first buffer layer, a gate electrode disposed on the first insulating layer, and a third source electrode and a third drain electrode disposed on the fourth insulating layer.

The third source electrode may be connected to the anode reset voltage line, and the third drain electrode may be connected to the common node reset voltage line.

The display device may further include a common node reset electrode disposed on the planarization layer in the non-display area, wherein the common node reset electrode may be connected to the charge generation layer and the common node reset voltage line through a contact hole.

The common node reset electrode may be further disposed in the display area and is connected to the charge generation layer and the common node reset voltage line through at least one contact hole in the display area.

A display device according to an embodiment may include a substrate including a display area and a non-display area, a first buffer layer disposed on the substrate, a first semiconductor layer of a first transistor disposed on the buffer layer in the display area, a first insulating layer disposed on the first semiconductor layer, a first gate electrode of the first transistor disposed on the first insulating layer in the display area, a second insulating layer disposed on the gate electrode of the first transistor, a second buffer layer disposed on the second insulating layer, a second semiconductor layer of a second transistor disposed on the second buffer layer in the display area, a third insulating layer disposed on the second semiconductor layer, a second gate electrode of the second transistor disposed on the third insulating layer in the display area, a fourth insulating layer disposed on the gate electrode of the second transistor, source and drain electrodes of the first and second transistors disposed on the fourth insulating layer in the display area, a protective film disposed on the source and drain electrodes, a planarization layer disposed on the protective film, an anode electrode of a light-emitting element disposed on the planarization layer in the display area, a first light-emitting unit of the light-emitting element disposed on the anode electrode, a charge generation layer of the light-emitting element disposed on the first light-emitting unit, constituting a common node, a second light-emitting unit of the light-emitting element disposed on the charge generation layer, and a cathode electrode of the light-emitting element disposed on the second light-emitting unit.

The display device may further include a connection transistor in the non-display area including a third semiconductor layer disposed on the first buffer layer, a gate electrode disposed on the first insulating layer, and a third source electrode and a third drain electrode disposed on the fourth insulating layer.

The third source electrode may be connected to an anode reset voltage line, and the third drain electrode may be connected to a common node reset voltage line.

The display device may further include a common node reset electrode disposed on the planarization layer in the non-display area, the common node reset electrode being connected to the common node reset voltage line through a contact hole.

The charge generation layer may extend from the display area to the non-display area and may be connected to the common node reset electrode through a contact hole in the non-display area.

The common node reset electrode may be further disposed in the display area and is connected to the charge generation layer and the common node reset voltage line through at least one contact hole in the display area.

The planarization layer may include a first planarization layer and a second planarization layer disposed on the first planarization layer, and the common node reset voltage line and the anode reset voltage line may include a first conductive layer disposed on the first planarization layer, and a second conductive layer disposed on the fourth insulating layer and connected to the first conductive layer through a contact hole.

DETAILED DESCRIPTION

Figure 1:
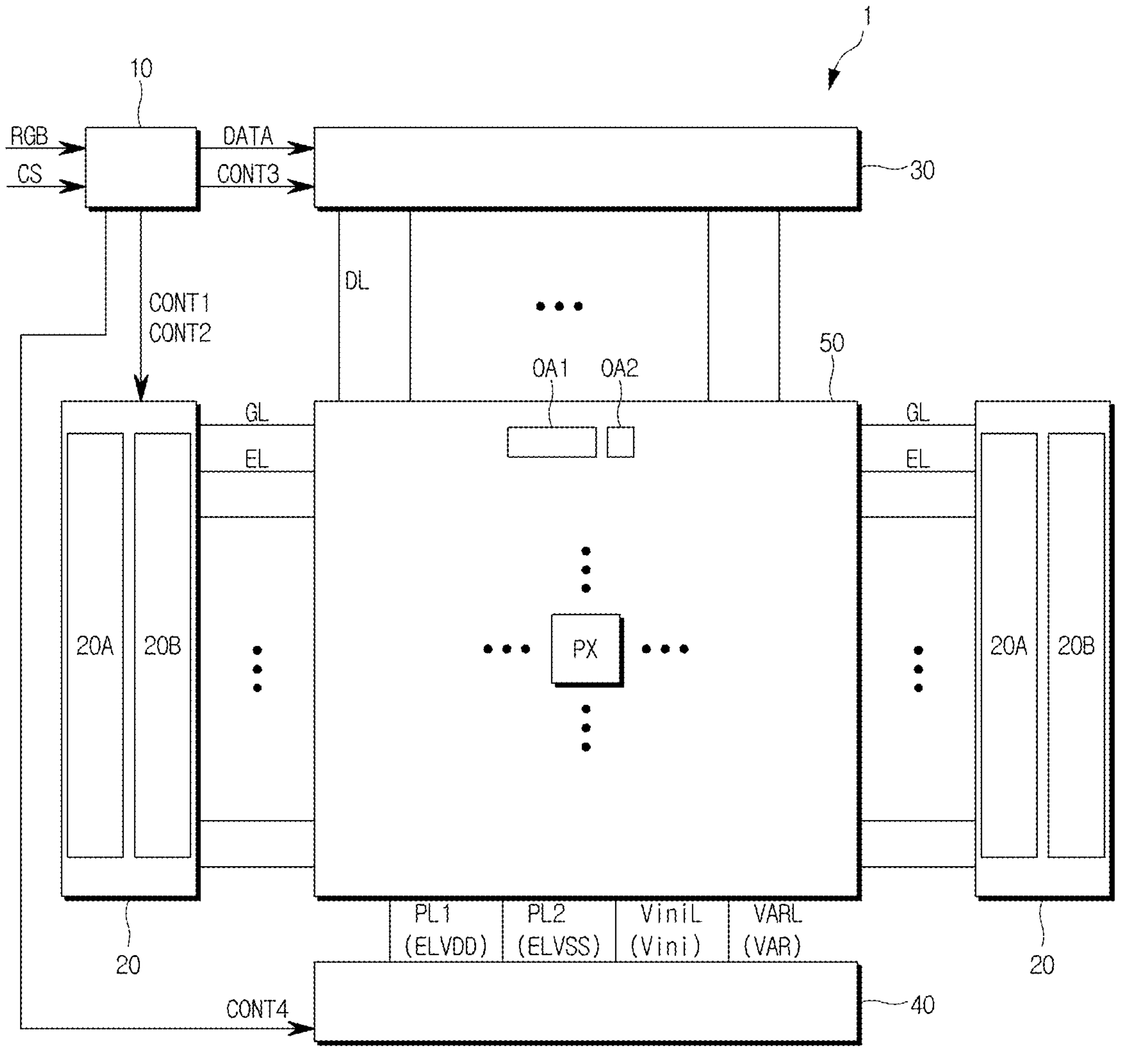
FIG. 1 is a block diagram illustrating a configuration of a display device according to an embodiment.

Hereinafter, embodiments will be described with reference to accompanying drawings. In the specification, when a component (or area, layer, part, etc.) is mentioned as being "on top of," "connected to," or "coupled to" another component, it means that it may be directly connected/coupled to the other component, or a third component may be placed between them.

The same reference numerals refer to the same components. In addition, in the drawings, the thickness, proportions, and dimensions of the components are exaggerated for effective description of the technical content. The expression "and/or" is taken to include one or more combinations that can be defined by associated components.

The terms "first," "second," etc. are used to describe various components, but the components should not be limited by these terms. The terms are used only for distinguishing one component from another component. For example, a first component may be referred to as a second component and, similarly, the second component may be referred to as the first component, without departing from the scope of the present invention. The singular forms are intended to include the plural forms as well unless the context clearly indicates otherwise.

The terms such as "below," "lower," "above," "upper," etc. are used to describe the relationship of components depicted in the drawings. The terms are relative concepts and are described based on the direction indicated on the drawing.

It will be further understood that the terms "comprises," "has," and the like are intended to specify the presence of stated features, numbers, steps, operations, components, parts, or a combination thereof but are not intended to preclude the presence or possibility of one or more other features, numbers, steps, operations, components, parts, or combinations thereof.

FIG. 1 is a block diagram illustrating the configuration of a display device according to an embodiment.

With reference to FIG. 1, the display device 1 includes a timing controller 10, a gate driver 20, a data driver 30, a power supply unit 40 (e.g., a circuit), and a display panel 50.

The timing controller 10 may receive video signals RGB and control signals CS from external host systems or the like. The video signals may include a plurality of grayscale data. The control signals CS may include a horizontal sync signal, a vertical sync signal, and a main clock signal.

The timing controller 10 may process the image signal RGB and control signal CS to be suitable for the operating conditions of the display panel 60 and may generate and output image data DATA, a gate driving control signal CONT1, a light-emission driving control signal CONT2, a data driving control signal CONT3, and a power supply control signal CONT4.

The gate driver 20 may include a scan driving circuit 20A that generates scan signals based on the gate driving control signal CONT1 received from the timing controller 10. The scan driving circuit 20A may provide the generated scan signals to the pixels PX through multiple scan lines GL. In one embodiment, a single pixel PX may be configured to receive multiple scan signals having different waveforms. In this case, the scan driving circuit 20A may provide the multiple scan signals to the pixels PX through corresponding scan lines GL.

The gate driver 20 may further include a light-emission driving circuit 20B that generates light-emission control signals based on the light-emission driving control signal CONT2 received from the timing controller 10. The light-emission driving circuit 20B may provide the generated light-emission control signals to the pixels PX through light-emission lines EL.

The gate driver 20 may be configured in a Gate In Panel (GIP) form, implemented on the display panel 50. The gate driver 20 may be disposed on one side of the display panel 50 or, as shown in the drawing, on both sides (e.g., left and right) of the display panel 50. Depending on the driving method, panel design method, etc., the gate driver 20 may be disposed on both sides (e.g., left and right) of the display panel 50, as shown in the drawing, or may be connected to two or more of the four sides of the display panel 50.

The data driver 30 may generate data signals based on the image data DATA and data driving control signal CONT3 output from the timing controller 10. The data driver 30 may provide the generated data signals to the pixels PX through multiple data lines DL.

The power supply unit 40 may generate high-potential driving voltage ELVDD and low-potential driving voltage ELVSS to be provided to the display panel 50 based on the power supply control signal CONT4. The power supply unit 40 may provide the generated driving voltages ELVDD and ELVSS to the pixels PX through the corresponding voltage lines PL1 and PL2. Additionally, the power supply unit 40 may further generate initialization voltage Vini, on-bias voltage Vobs, and/or anode reset voltage VAR required for driving the pixels PX and provide them to the pixels PX through the corresponding voltage lines ViniL, VobsL, and VARL.

The display panel 50 includes a plurality of pixels PX (or sub-pixels) arranged thereon. The pixels PX may be arranged in a matrix form on the display panel 50, for example. The pixels PX arranged in a single pixel row are connected to the same scan line GL and light-emission line EL, and the pixels PX arranged in a single pixel column are connected to the same data line DL. The pixels PX may emit light with a brightness corresponding to the scan signals and data signals supplied through the scan line GL and data line DL in response to the light-emission control signals applied through the light-emission line EL.

In one embodiment, each pixel PX may display one of the colors, red, green, or blue. In another embodiment, each pixel PX may display one of the colors, cyan, magenta, or yellow. In various embodiments, each pixel PX may display one of the colors, red, green, blue, or white.

In one embodiment, one or more optical areas OA1 and OA2 may be arranged on the display panel 50. The one or more optical areas OA1 and OA2 may be arranged in overlap with one or more optoelectronic devices, such as imaging devices (e.g., cameras or image sensors), proximity sensors, or illuminance sensors.

To operate the optoelectronic devices, the one or more optical areas OA1 and OA2 may include a light-transmissive structure that has a transmittance above a certain level. The light-transmissive structure may be formed by patterning the cathode electrode in areas where pixels PX are not arranged. The cathode electrode may be patterned either by laser removal or by selective formation using a cathode deposition prevention layer.

Alternatively, the light-transmissive structure may be formed by separating the light-emitting elements within the pixel PX. In this embodiment, the light-emitting element of the pixel PX is located in the optical areas OA1 and OA2, the multiple transistors constituting the pixel PX are arranged around the optical areas OA1 and OA2, and the light-emitting element and the pixel may be electrically connected through a transparent metal layer.

The number of pixels PX per unit area in one or more optical areas OA1 and OA2 may be smaller than the number of pixels PX per unit area in the remaining area excluding the optical areas OA1 and OA2. That is, the resolution of the one or more optical areas OA1 and OA2 may be lower than the resolution of the remaining area.

Figure 2:
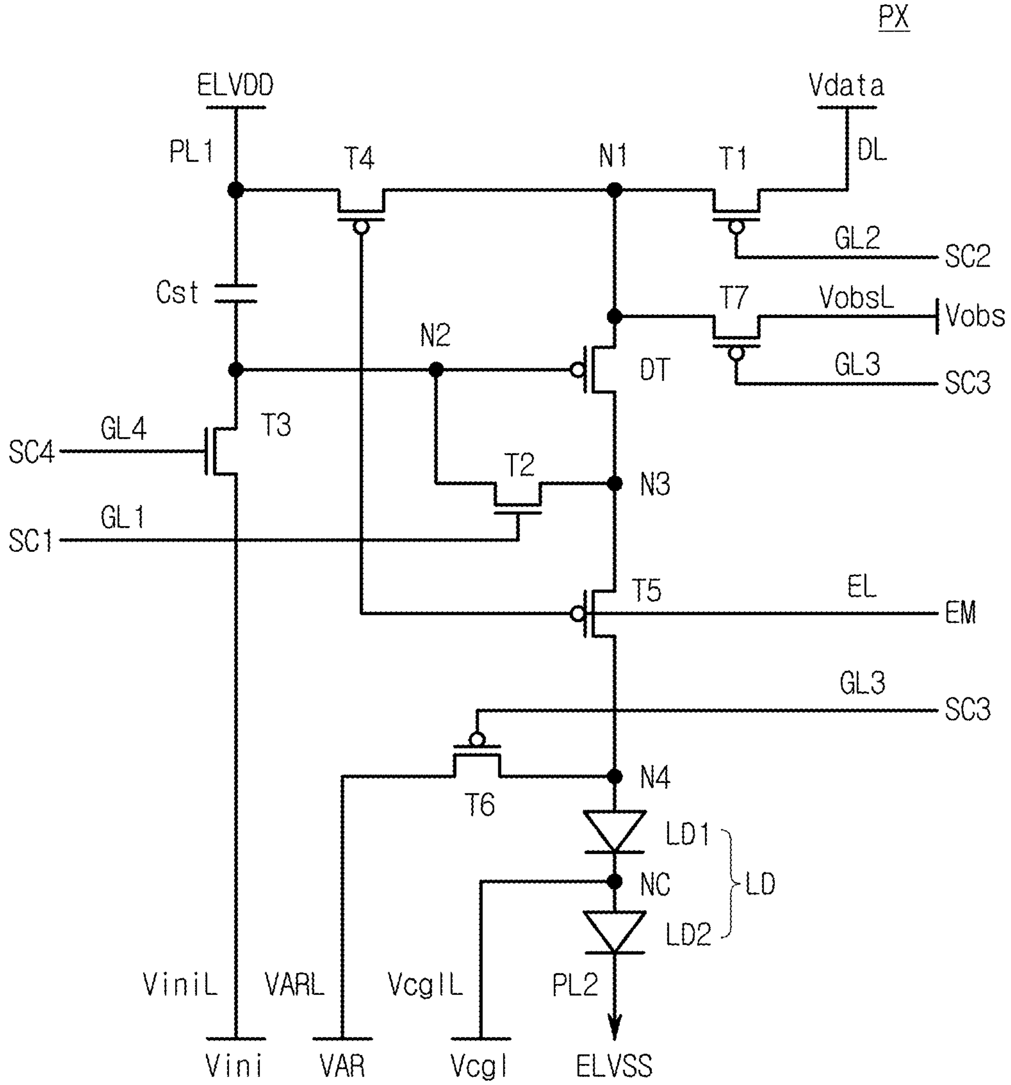
FIG. 2 is a circuit diagram of a pixel according to an embodiment.

FIG. 2 is a circuit diagram of a pixel according to an embodiment. FFIG. 3 is a circuit diagram of a pixel according to another embodiment.

Referring to FIG. 2, the pixel PX according to an embodiment may include a control circuit for controlling the amount of driving current to be applied to the light-emitting element LD through the driving transistor DT, which is connected to the driving transistor DT and the light-emitting element LD. For example, the control circuit may include transistors T1 to T7 and a storage capacitor Cst.

The first electrode (e.g., source electrode) of the driving transistor DT is connected to the data line DL through the first node N1, and the second electrode (e.g., drain electrode) is connected to the light-emitting element LD through the third node N3. The gate electrode of the driving transistor DT is configured to be supplied with a high voltage driving voltage ELVDD through the second node N2 (connected to the high-potential driving voltage line PL1). The driving transistor DT may be turned on based on the voltage difference between the second node N2 and the first node N1 (i.e., the gate-source voltage) to control the amount of driving current flowing through the light-emitting element LD.

The first electrode of the first transistor T1 is connected to the data line DL, and the second electrode is connected to the source electrode of the driving transistor DT through the first node N1. The gate electrode of the first transistor T1 is connected to the second scan line GL2 and may receive the second scan signal SC2. The first transistor T1 may turn on according to the second scan signal SC2 applied to the second scan line GL2 and may transfer the data voltage Vdata applied to the data line DL to the first node N1. The first transistor T1 may be referred to as a switching transistor.

The second transistor T2 is connected between the second node N2 and the third node N3. The gate electrode of the second transistor T2 is connected to the first scan line GL1 and may receive the first scan signal SC1. The second transistor T2 may turn on according to the first scan signal SC1 applied to the first scan line GL1 and electrically connect the gate and drain electrodes of the driving transistor DT. The second transistor T2 may be referred to as a compensation transistor.

The first electrode of the third transistor T3 is connected to the second node N2, and the second electrode is configured to receive the initialization voltage Vini (connected to the initialization voltage line ViniL). The gate electrode of the third transistor T3 is connected to the fourth scan line GL4 and may receive the fourth scan signal SC4. The third transistor T3 may turn on according to the fourth scan signal SC4 applied to the fourth scan line GL4 and apply the initialization voltage Vini to the gate electrode of the driving transistor DT. The third transistor T3 may be referred to as an initialization transistor.

The first electrode of the fourth transistor T4 is configured to receive a high-potential driving voltage ELVDD (connected to the high-potential driving voltage line PL1), and the second electrode is connected to the driving transistor DT via the first node N1. The gate electrode of the fourth transistor T4 is connected to the light-emission element EL to receive a light-emission signal EM. In response to the light-emission signal EM applied to the light-emission element EL, the fourth transistor T4 may connect the high-potential driving voltage line PL1 and the driving transistor DT.

The first electrode of the fifth transistor T5 is connected to the driving transistor DT via the third node N3, and the second electrode is connected to the light-emitting element LD via the fourth node N4. The gate electrode of the fifth transistor T5 is connected to the light-emission element EL to receive a light-emission signal EM. In response to the light-emission signal EM applied to the light-emission element EL, the fifth transistor T5 may connect the driving transistor DT and the light-emitting element LD.

When the fourth transistor T4 and the fifth transistor T5 are turned on, a current path is formed between the high-potential driving voltage ELVDD and the low-potential driving voltage ELVSS, and driving current flows through the light-emitting element LD, causing the light-emitting element LD to emit light. The fourth transistor T4 and the fifth transistor T5 may be referred to as light-emission transistors.

The first electrode of the sixth transistor T6 is configured to receive an anode reset voltage VAR (connected to the anode reset voltage line VARL), and the second electrode is connected to the fourth node N4. The gate electrode of the sixth transistor T6 is connected to the third scan line GL3 to receive the third scan signal SC3. In response to the third scan signal SC3 applied to the third scan line GL3, the sixth transistor T6 may be turned on and apply the anode reset voltage VAR to the anode electrode of the light-emitting element LD. The sixth transistor T6 may be referred to as an anode reset transistor.

The first electrode of the seventh transistor T7 is connected to the first node N1, and the second electrode is configured to receive the on-bias voltage Vobs (connected to the on-bias voltage line VobsL). The gate electrode of the seventh transistor T7 is connected to the third scan line GL3 to receive the third scan signal SC3. In response to the third scan signal SC3 applied to the third scan line GL3, the seventh transistor T7 may turn on and apply the on-bias voltage Vobs to the source electrode of the driving transistor DT. The seventh transistor T7 may be referred to as an on-bias transistor.

The storage capacitor Cst is connected between the high-potential driving voltage line PL1 and the second node N2. The storage capacitor Cst stores a voltage corresponding to the voltage difference between the high-potential driving voltage ELVDD and the second node N2, and maintains the stored voltage during one frame period to stabilize the voltage of the gate electrode (i.e., the second node N2) of the driving transistor DT.

The light-emitting element LD may have its anode electrode connected to the fourth node N4 and its cathode electrode connected to the low-potential driving voltage ELVSS (connected to the low-potential driving voltage line PL2). When the driving transistor DT, the fourth transistor T4, and the fifth transistor T5 are turned on, a current path is formed between the high-potential driving voltage ELVDD and the low-potential driving voltage ELVSS, allowing driving current to flow through the light-emitting element LD. The light-emitting element LD may emit light with brightness corresponding to the amount of applied driving current.

In one embodiment, the light-emitting element LD may have a tandem structure where multiple light-emitting units LD1 and LD2 are connected in series. By having multiple light-emitting units LD1 and LD2 stacked, the light-emitting element LD may improve emission purity and efficiency. Adjacent light-emitting units LD1 and LD2 may be connected through a common node NC. The common node NC may be composed of a charge generation layer. The structure of the light-emitting units LD1 and LD2 and the charge generation layer forming the common node NC will be described in more detail later with reference to FIG. 5.

In one embodiment, the common node NC may be connected to a common node reset voltage line VcglL, which applies a common node reset voltage Vcgl. The common node reset voltage Vcgl may, for example, be the same as the anode reset voltage VAR, but is not limited thereto.

When the common node reset voltage Vcgl is the same as the anode reset voltage VAR, the common node reset voltage line VcglL may be electrically connected to the anode reset voltage line VARL. For example, the common node reset voltage line VcglL and the anode reset voltage line VARL may be electrically connected in the edge region (edge area, non-display area) of the display panel 50 (FIG. 1). The connection structure between the common node reset voltage line VcglL and the anode reset voltage line VARL will be described in more detail later with reference to the accompanying drawings.

Figure 3:
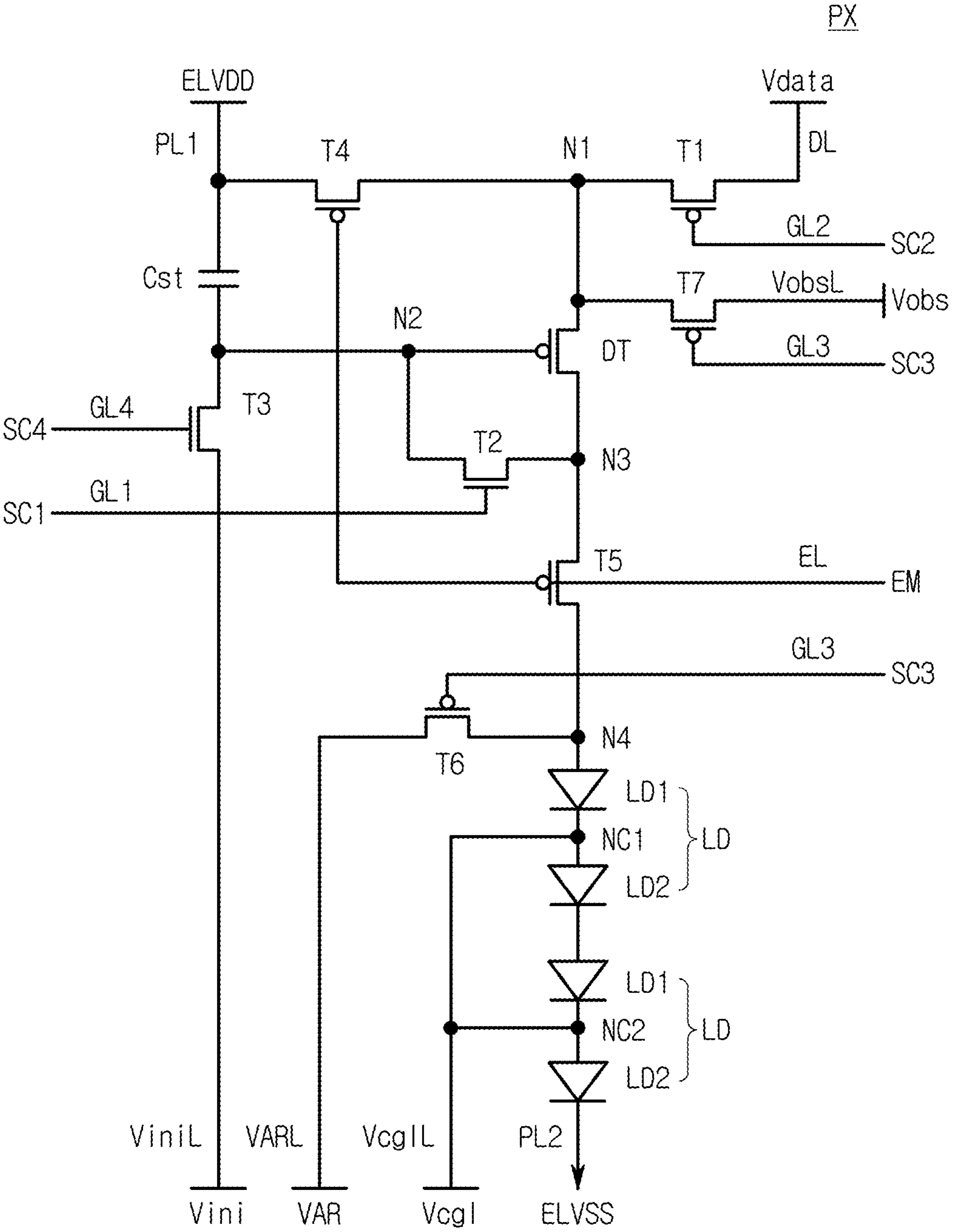
FIG. 3 is a circuit diagram of a pixel according to another embodiment.

In the illustrated embodiment, the light-emitting element LD is composed of two light-emitting units, LD1 and LD2. However, in other embodiments, the light-emitting element LD may include a greater number of light-emitting units, as shown in FIG. 3. In this case, the light-emitting units LD1 and LD2 in each adjacent light-emitting element LD may be connected through common nodes NC1 and NC2, respectively. Additionally, multiple common nodes NC1 and NC2 may be commonly connected to the common node reset voltage line VcglL.

In the embodiments illustrated in FIGS. 2 and 3, the pixel PX may include a low temperature poly-silicon (LTPS) transistor. The LTPS transistor includes a gate electrode, a source electrode, and a drain electrode. The LTPS transistor has an active layer formed of polycrystalline silicon. The LTPS transistor may be configured as a P-type transistor. Such an LTPS transistor has a high electron mobility, thus providing fast driving characteristics.

In one embodiment, the driving transistor DT may be composed of an LTPS transistor. Additionally, at least one of the transistors T2 to T6 requiring fast driving characteristics, such as T4, T5, T6, and T7, may be composed of an LTPS transistor. In particular, as the fourth transistor T4 and the fifth transistor T5 are composed of LTPS transistors, when the light-emission signal EM is applied at the turn-on level, the fourth transistor T4 and the fifth transistor T5 may quickly turn on, thus speeding up the light-emitting response of the light-emitting element LD.

Furthermore, in one embodiment, the pixel PX may be of a hybrid type that further includes an oxide semiconductor transistor. The oxide semiconductor transistor includes a gate electrode, a source electrode, and a drain electrode. The oxide semiconductor transistor has an active layer formed of an oxide semiconductor. Here, the oxide semiconductor may be set as either an amorphous or crystalline oxide semiconductor. The oxide semiconductor transistor may be configured as an N-type transistor. The oxide semiconductor transistor allows for low-temperature processing and has a lower charge mobility compared to an LTPS transistor. Such an oxide semiconductor transistor has excellent off-current characteristics.

In the embodiments of FIGS. 2 and 3, the second and third transistors T2 and T3 are composed of LTPS transistors. However, the embodiment is not limited thereto.

Figure 4:
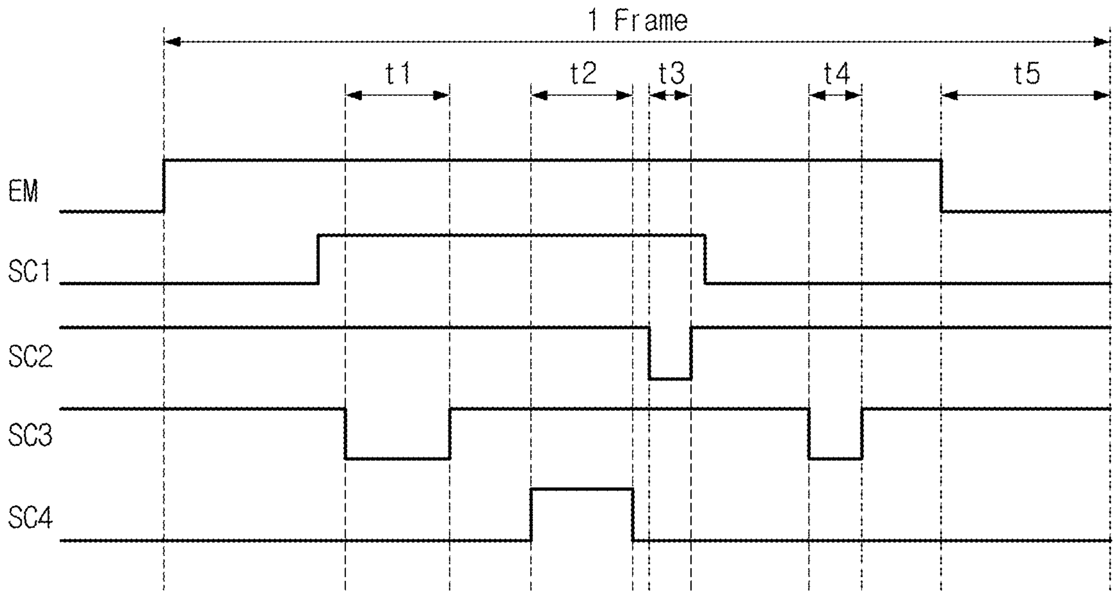
FIG. 4 is a timing diagram illustrating a driving method for the pixel shown in FIG. 2 according to an embodiment.

FIG. 4 is a timing diagram illustrating a driving method for the pixel shown in FIG. 2 according to an embodiment.

Referring to FIGS. 2 and 4 together, one frame may include a first on-bias and anode reset period t1, an initialization period t2, a sampling and programming period t3, a second on-bias and anode reset period t4, and a light-emitting period t5.

During the first on-bias and anode reset period t1, the voltage of the source electrode of the driving transistor DT is biased, and the voltage of the anode electrode of the light-emitting element LD is reset.

Specifically, during the first on-bias and anode reset period t1, a turn-on level (e.g., high level) first scan signal SC1 is applied, causing the second transistor T2 to turn on, electrically connecting the second node N2 and the third node N3.

Additionally, during the first on-bias and anode reset period t1, a turn-on level (e.g., low level) third scan signal SC3 is applied, and the sixth transistor T6 and the seventh transistor T7 are turned on, applying the anode reset voltage VAR and the on-bias voltage Vobs to the anode electrode of the light-emitting element LD and the source electrode of the driving transistor DT, respectively. The voltage of the source electrode of the driving transistor DT is set to the on-bias voltage Vobs, thereby reducing the on-bias stress of the driving transistor DT.

In one embodiment, the anode reset voltage VAR may be the same or different for each pixel PX. For example, for a pixel PX displaying the red color (hereinafter referred to as the red pixel), the anode reset voltage VAR may be approximately 0.7V. For a pixel PX displaying the green or blue color (hereinafter referred to as the green pixel or blue pixel), the anode reset voltage VAR may be approximately 1.8V. However, the embodiment is not limited thereto.

During the initialization period t2, the voltages of the main nodes of the pixel PX are initialized.

Specifically, during the initialization period t2, the third scan signal SC3 is switched to a turn-off level (e.g., high level), causing the sixth transistor T6 and the seventh transistor T7 to turn off.

Additionally, during the initialization period t2, a turn-on level (e.g., high level) fourth scan signal SC4 is applied, causing the third transistor T3 to turn on, applying the initialization voltage Vini to the gate electrode of the driving transistor DT. The initialization voltage Vini may further be applied to the drain electrode of the driving transistor DT through the second transistor T2 in a turn-on state. The initialization voltage Vini may be a low-level positive voltage and may correspond to a voltage for black luminance, but is not limited thereto.

The storage capacitor Cst stores the voltage difference between the high-potential driving voltage ELVDD and the initialization voltage Vini, which is the voltage of the second node N2.

During the sampling and programming period t3, the threshold voltage Vth of the driving transistor DT is sampled, and the data voltage Vdata is programmed into the pixel PX.

Specifically, during the sampling and programming period t3, the fourth scan signal SC4 is switched to a turn-off level (e.g., low level), causing the third transistor T3 to turn off.

Additionally, during the sampling and programming period t3, a turn-on level (e.g., low level) second scan signal SC2 is applied, causing the first transistor T1 to turn on, and the data voltage Vdata may be applied to the source electrode of the driving transistor DT. The gate electrode and drain electrode of the driving transistor DT are electrically connected by the third transistor T2 in the turn-on state, and the drain electrode of the driving transistor DT is floating, resulting in a voltage-variable state (drain-follower state).

During the sampling and programming period t3, the gate-source voltage Vgs of the driving transistor DT is set to be lower (e.g., less) than the threshold voltage Vth, that is, in an on condition, as the difference voltage between the data voltage Vdata and the initialization voltage Vini. Thus, the driving transistor DT is turned on, and it can supply source-drain current to the drain electrode until the gate-source voltage Vgs reaches the threshold voltage Vth of the driving transistor DT. The voltage of the gate electrode, i.e., the second node N2, increases from the initialization voltage Vini and converges to the sum of the data voltage Vdata and the threshold voltage Vth, i.e., the voltage Vdata+Vth.

The storage capacitor Cst stores the difference voltage between the high-potential driving voltage ELVDD and the voltage of the second node N2, i.e., ELVDD−(Vdata+Vth). During the sampling and programming period t3, the voltage programmed on the gate electrode of the driving transistor DT is the voltage compensated by the threshold voltage Vth.

During the second on-bias and anode reset period t4, the first scan signal SC1 and the second scan signal SC2 are switched to the turn-off level, and the first transistor T1 and the second transistor T2 are turned off.

Additionally, during the second on-bias and anode reset period t4, the third scan signal SC3 at the turn-on level (e.g., low level) is applied, and the sixth transistor T6 and the seventh transistor T7 are turned on, so that the anode reset voltage VAR and the on-bias voltage Vobs are applied to the anode electrode of the light-emitting element LD and the source electrode of the driving transistor DT, respectively. The on-bias voltage Vobs applied during the second on-bias and anode reset period t4 may be the same as or different from the on-bias voltage Vobs applied during the first on-bias and anode reset period t1.

During the light-emission period t5, the turn-on light-emitting element LD may emit light with a brightness corresponding to the programmed voltage. Specifically, during the light-emission period t5, the third scan signal SC3 is switched to the turn-off level, and the light-emission signal EM may be applied at the turn-on level (e.g., low level).

In response to the light-emission signal EM, when the fourth and fifth transistors T4 and T5 are turned on, the driving current may flow from the high-potential driving voltage ELVDD through the driving transistor DT to the light-emitting element LD. Due to the driving current, the voltage at the drain electrode of the driving transistor DT rises to the operating point voltage of the light-emitting element LD. At this point, the gate electrode is maintained at the voltage programmed by the storage capacitor Cst. The light-emitting element LD emits light in response to the driving current when the voltage at the drain electrode of the driving transistor DT becomes equal to the operating point voltage. Here, the voltage programmed at the gate electrode of the driving transistor DT is the voltage compensated by the threshold voltage Vth from the data voltage Vdata. Therefore, the degradation of the driving transistor DT may be compensated.

In another embodiment, a common node NC that connects the light-emitting units LD1 and LD2 of the light-emitting element LD in a different pixel PX may be connected to the common node reset voltage line VcglL. The common node reset voltage line VcglL may be configured to apply the common node reset voltage Vcgl to the common node NC when the anode reset voltage VAR is applied to the anode electrode of the light-emitting element LD, which is the fourth node N4.

Specifically, during the first and second on-bias and anode reset periods t1 and t4, the sixth transistor T6 may respond to the turn-on level of the third scan signal SC3 and apply the anode reset voltage VAR to the anode electrode. The common node reset voltage line VcglL may be configured to apply the common node reset voltage Vcgl to the common node NC when the third scan signal SC3 is applied at the turn-on level.

In one embodiment, the common node reset voltage Vcgl may be the same voltage as the anode reset voltage VAR. In this embodiment, the common node reset voltage line VcglL may be electrically connected to the anode reset voltage line VARL in response to the third scan signal SC3 during the first and second on-bias and anode reset periods t1 and t4. Thus, the anode reset voltage VAR may be applied as the common node reset voltage Vcgl to the common node NC.

Figure 5:
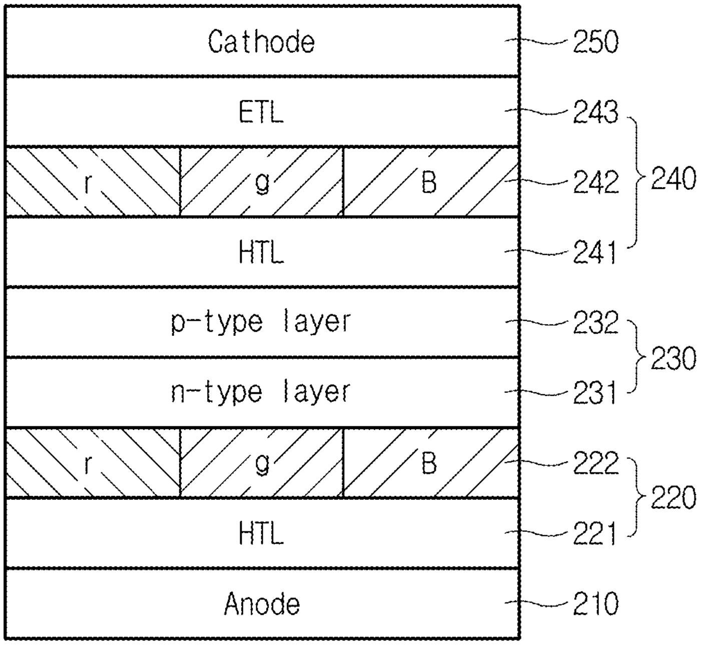
FIG. 5 is a diagram illustrating the structure of a light-emitting element according to an embodiment.

FIG. 5 is a diagram illustrating the structure of a light-emitting element according to an embodiment.

Referring to FIG. 5, the light-emitting element LD according to one embodiment may have a tandem structure in which two light-emitting units 220 and 240 are connected in series to emit light. Specifically, the light-emitting element LD includes a first electrode 210 and a second electrode 250, which are arranged to face each other, the first light-emitting unit 220 and the second light-emitting unit 240 disposed between the first electrode 210 and the second electrode 250, and a charge generation layer 230 disposed between the first light-emitting unit 220 and the second light-emitting unit 240.

Here, the first electrode 210 may be the anode electrode, and the second electrode 250 may be the cathode electrode. Additionally, the first light-emitting unit 220 may be disposed adjacent to the first electrode 210, and the second light-emitting unit 240 may be disposed adjacent to the second electrode 250.

The first light-emitting unit 220 may include a first hole transport layer 221 and a first light-emitting layer 222 disposed on the first hole transport layer 221. The first electrode 210, the first hole transport layer 221, and the first light-emitting layer 222 may be sequentially stacked.

The second light-emitting unit 240 may include a second hole transport layer 241 and a second electron transport layer 243 arranged to face each other, and a second light-emitting layer 242 disposed between the second hole transport layer 241 and the second electron transport layer 244. The second hole transport layer 241, the second light-emitting layer 242, the second electron transport layer 243, and the second electrode 250 may be sequentially stacked.

According to the embodiment, a hole injection layer may further be disposed between the first electrode 210 and the first hole transport layer 221. An electron transport layer may further be disposed between the first light-emitting layer 222 and the charge generation layer 230. Additionally, an electron injection layer may further be disposed between the second electron transport layer 243 and the second electrode 250.

The first and second light-emitting layers 222 and 242 may include a plurality of light-emitting materials that emit light in different colors. For example, each of the first light-emitting layer 222 and the second light-emitting layer 242 may include blue light-emitting material (B), red light-emitting material (R), and green light-emitting material (G). Each light-emitting material (R, G, B) may be formed in regions within the light-emitting layers 222 and 242. The charge generation layer 230 is disposed between the light-emitting units 220 and 240, regulating the charge between the light-emitting units 220 and 240, thereby achieving charge balance. The charge generation layer 230 may include a negative charge generation layer 231 (n-type charge generation layer) adjacent to the first light-emitting unit 220 to supply electrons to the first light-emitting unit 220, and a positive charge generation layer 232 (p-type charge generation layer) adjacent to the second light-emitting unit 240 to supply holes to the second light-emitting unit 240. The light-emitting efficiency of the light-emitting element LD may be further increased through the negative charge generation layer 231 and the positive charge generation layer (p-type charge generation layer, 232).

The charge generation layer 230 may be formed of a metal such as aluminum (Al), or a transparent conductive material such as indium tin oxide (Indium Tin Oxide, ITO). Alternatively, the charge generation layer 230 may be formed by doping n-type and p-type materials into an organic material.

When a voltage is applied to the first electrode 210 and the second electrode 250 of the light-emitting element LD as described above, electrons are generated in the negative charge generation layer 231 and move to the first light-emitting unit 220, while holes are injected from the first electrode 210 into the first light-emitting unit 220, where holes combine with the electrons of the first light-emitting unit 220. This allows the first light-emitting unit 220 to emit light.

Similarly, electrons are injected from the second electrode 250 into the second light-emitting unit 240, while holes are generated in the positive charge generation layer 232 and move to the second light-emitting unit 240, where the holes combine with the electrons of the second light-emitting unit 240. This allows the second light-emitting unit 240 to emit light.

Figure 6:
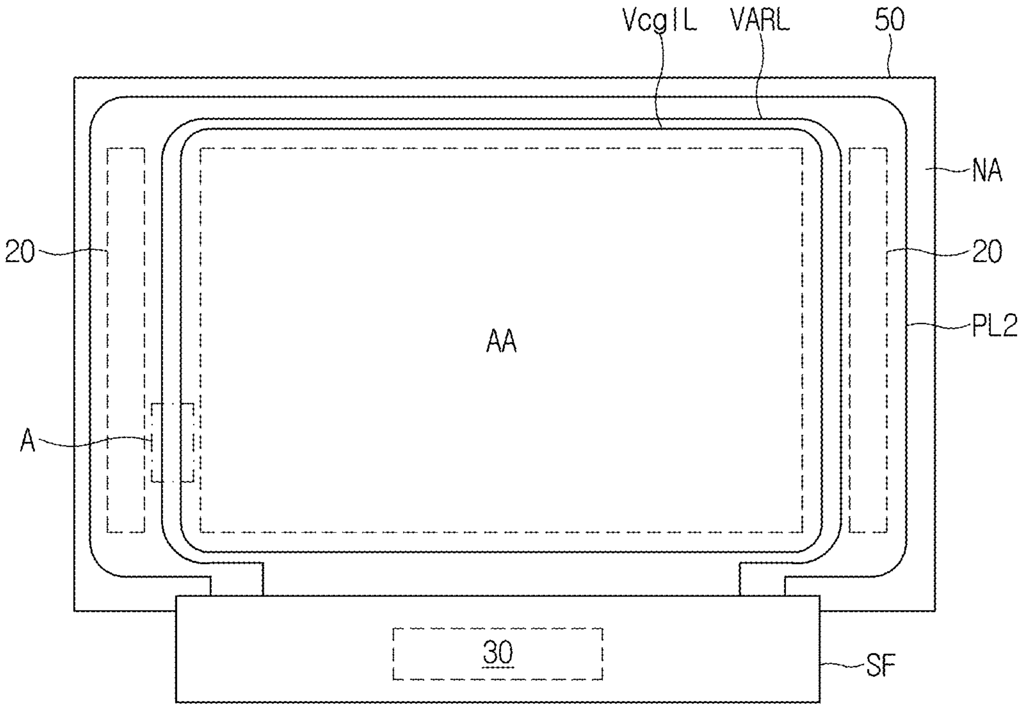
FIG. 6 is a plan view illustrating the configuration of a display panel according to an embodiment.

FIG. 6 is a block diagram illustrating the configuration of a display panel according to an embodiment.

Referring to FIG. 6, the display panel 50 may include a display area AA, where images are displayed, and a non-display area NA surrounding the display area AA, where images are not displayed.

The display area AA has an array of pixels PX (FIG. 1).

The non-display area NA may include at least part of the driving section that is mounted or connected. For example, the gate driving section 20 may be placed in the non-display area NA on one side of the display area AA or, as shown, on both sides (e.g., left or right). The data driving section 30 may be mounted on a flexible film SF using a Chip On Film COF or Chip On Plastic COP method and connected to one side of the display panel 50. In one embodiment, the data driving section 30 may be connected to the display panel 50 on the side where the gate driving section 20 is not placed.

The non-display area NA may include voltage lines that apply driving voltages to the pixels PX. These voltage lines may include, for example, high-potential driving voltage line PL1, low-potential driving voltage line PL2, on-bias voltage line VobsL, initialization voltage line ViniL, anode reset voltage line VARL, and common node reset voltage line VcglL, as shown in FIG. 1. In FIG. 6, the low-potential driving voltage line PL2, the anode reset voltage line VARL, and the common node reset voltage line VcglL are shown for convenience of explanation.

The low-potential driving voltage line PL2 is disposed at the edge of the non-display area NA and may be disposed outside the gate driver 20. The low-potential driving voltage line PL2 is formed in a closed-loop shape along the edge of the display panel 50 and may surround at least three sides of the display area AA. For example, the low-potential driving voltage line PL2 may extend from the internal wiring of a flexible film, where the data driver 30 is mounted on one side of the display panel 50, and extend to surround the three sides of the display area AA, and be formed to connect again with the internal wiring of the flexible film on the same side of the display panel 50.

The anode reset voltage line VARL and the common node reset voltage line VcglL are disposed in the non-display area NA and may be disposed inside the gate driver 20. That is, the anode reset voltage line VARL and the common node reset voltage line VcglL may be disposed between the gate driver 20 and the display area AA. The anode reset voltage line VARL and the common node reset voltage line VcglL are formed in a closed-loop shape along the edge of the display panel 50 and may surround at least three sides of the display area AA.

For example, the anode reset voltage line VARL may extend from the internal wiring of a flexible film, where the data driver 30 is mounted on one side of the display panel 50, and extend to surround the three sides of the display area AA, and be formed to connect again with the internal wiring of the flexible film on the same side of the display panel 50.

For example, the common node reset voltage line VcglL may be formed in a closed-loop shape surrounding all four sides of the display area AA.

The anode reset voltage line VARL and the common node reset voltage line VcglL may be configured to be electrically connected at least at some portions in the non-display area NA. For example, the anode reset voltage line VARL and the common node reset voltage line VcglL may be electrically connected at one or more points through at least one switching element. The switching element may be, for example, a transistor.

Figure 7:
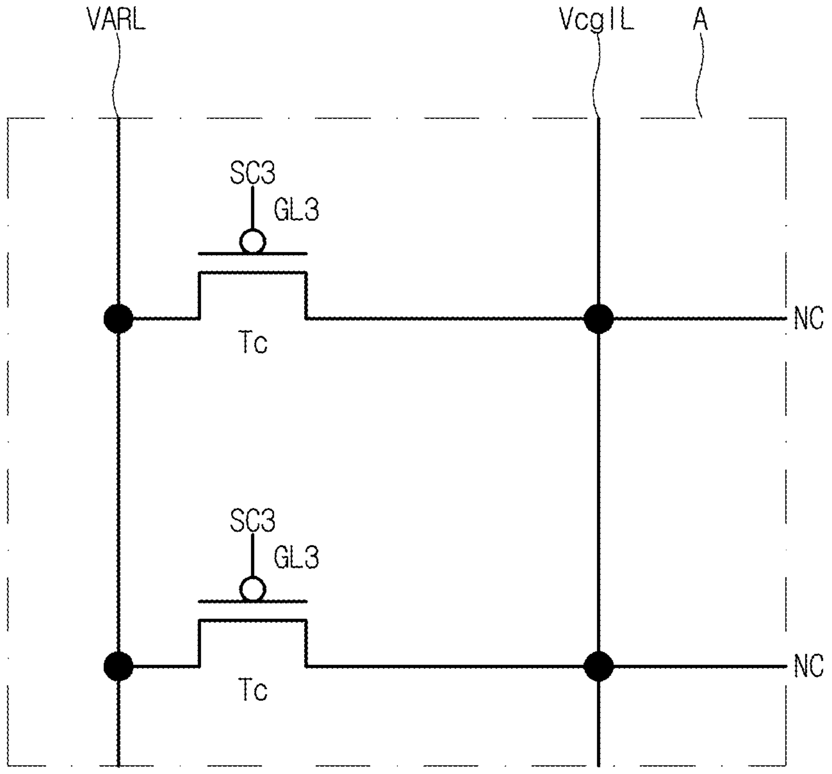
FIG. 7 is an enlarged plan view of region A in FIG. 6 according to an embodiment.

FIG. 7 is an enlarged plan view of region A in FIG. 6 according to an embodiment.

As described with reference to FIG. 6, the anode reset voltage line VARL and the common node reset voltage line VcglL are configured to be electrically connected at least at one point. For example, the anode reset voltage line VARL and the common node reset voltage line VcglL may be connected through one or more connection transistors Tc.

The first electrode of the connection transistor Tc is connected to the anode reset voltage line VARL, and the second electrode is connected to the common node reset voltage line VcglL. The gate electrode of the connection transistor Tc is connected to the third scan line GL3, where it may receive the third scan signal SC3. The connection transistor Tc turns on when the third scan signal SC3 at the turn-on level is applied to the third scan line GL3, thereby electrically connecting the anode reset voltage line VARL and the common node reset voltage line VcglL.

The connection transistor Tc is controlled such that when the seventh transistor T7 is turned on, applying the anode reset voltage VAR to the anode electrode of the light-emitting element LD, the common node reset voltage Vcgl is applied to the common node NC. That is, the connection transistor Tc is configured to turn on with the seventh transistor T7 when the seventh transistor T7 is turned on, thus connecting the anode reset voltage line VARL and the common node reset voltage line VcglL. Therefore, the connection transistor Tc may be formed with the same type as the seventh transistor T7, for example, a P-type transistor, so as to be turned on together with the seventh transistor T7 in response to the third scan signal SC3.

Figure 8:
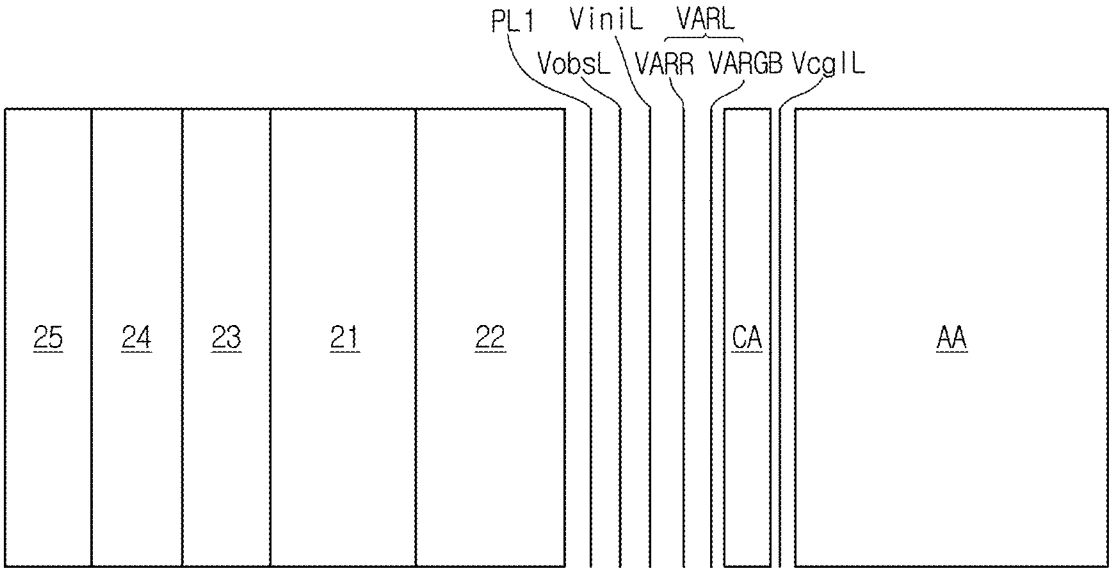
FIG. 8 is a block diagram illustrating the configuration of the gate driver in FIG. 6.

FIG. 8 is a block diagram illustrating the configuration of the gate driver in FIG. 6 according to an embodiment.

Referring to FIG. 8, the display panel 50 may include a display area AA where an image is displayed, and a non-display area around the display area AA where no image is displayed.

An array of pixels PX, as shown in FIG. 1, is arranged in the display area AA. The non-display area may include at least part of the driving unit mounted or connected. For example, the gate driver 20 may be positioned at one side of the display area AA or, as illustrated, on both sides (e.g., left or right) in the non-display area. The gate driver 20 arranged on both sides of the non-display area may be configured symmetrically (in a mirrored form). Hereinafter, the configuration will be described based on the gate driver 20 arranged on the left side of the display area AA.

The gate driver 20 may be composed of first to fifth shift registers 21 to 25.

The first to fourth shift registers 21 to 24 constitute a scan driving circuit 20A (FIG. 1), and are configured to output scan signals SC1, SC2, SC3, and SC4 (FIG. 2). For example, the first shift register 21 may sequentially output the first scan signal SC1 through the first scan lines, the second shift register 22 may sequentially output the second scan signal SC2 through the second scan lines, the third shift register 23 may sequentially output the third scan signal SC3 through the third scan lines, and the fourth shift register 24 may sequentially output the fourth scan signal SC4 through the fourth scan lines.

The first to fourth shift registers 21 to 24 may each be composed of stage circuits that are connected in a dependent manner. Each stage circuit may be connected to a corresponding scan line and may output scan signals SC1, SC2, SC3, and SC4 to the scan lines.

The first to fourth scan signals SC1, SC2, SC3, and SC4 may be used to drive at least one transistor provided in the pixel PX. For example, the first to fourth scan signals SC1, SC2, SC3, and SC4 may be used to program image data DATA (FIG. 1) into the pixel PX, initialize the voltage stored in the pixel PX, or compensate for the characteristics of circuit elements.

The fifth shift register 25 constitutes the emission driving circuit 20B (FIG. 1) and is configured to output an emission signal EM (FIG. 2). For example, the fifth shift register 25 may output the emission signal EM through the light-emission lines.

The emission signal EM may be used to drive at least one transistor provided in the pixel PX. For example, the emission signal EM may be used to control the light emission of the pixel PX.

Each of the first to fifth shift registers 21 to 25 is driven by receiving a corresponding start signal and a corresponding clock signal through at least one start signal line and multiple clock signal lines. In this case, each clock signal may have a different phase.

The clock signals applied to the first to fourth shift registers 21 to 24 may be applied through adjacent clock signal lines, and the clock signals applied to the fifth shift register 25 may be applied through adjacent clock signal lines. For example, the first to fourth shift registers 21 to 24 may receive the first and second gate clock signals applied through adjacent clock signal lines, and the fifth shift register 25 may receive the emission clock signal applied through adjacent clock signal lines. Here, the adjacent clock signal lines may be configured as a pair.

In one embodiment, the second shift register 22 may be arranged adjacent to the display area AA. Here, the first, third, and fourth shift registers 21, 23, and 24 may be arranged sequentially further away from the display area AA. In one embodiment, the fifth shift register 25 may be arranged at the outermost position.

The shift registers 21 to 25 may have the same or different areas. For example, as illustrated, the first and second shift registers 21 and 22 may have relatively large areas (widths), while the third to fifth shift registers 23, 24, and 25 may have relatively smaller areas (widths). However, the embodiments are not limited by this.

One or more bus lines may be arranged between the gate driver 20 and the display area AA. The bus lines may include, for example, a high-potential driving voltage line PL1, an on-bias voltage line VobsL, an initialization voltage line ViniL, and an anode reset voltage line VARL. The anode reset voltage line VARL may include, for example, an anode reset voltage line VARR connected to the red pixels and an anode reset voltage line VARGB connected to the green and blue pixels.

In one embodiment, a common node reset voltage line VcglL may be further arranged between the gate driver 20 and the display area AA. The common node reset voltage line VcglL may be electrically connected to the anode reset voltage line VARL in the non-display area. To achieve this, a connection area CA may be provided between the common node reset voltage line VcglL and the anode reset voltage line VARL. The connection area CA may include at least one switching element that is connected to the third scan line GL3 extending from the third shift register 23, and may selectively electrically connect the common node reset voltage line VcglL to the anode reset voltage line VARL according to the third scan signal SC3 output through the third scan line GL3. The switching element may be, for example, a connection transistor as explained with reference to FIG. 7, but is not limited thereto.

The bus lines may be connected to the pixels PX arranged in the display area AA via link lines branching from the bus lines. In one embodiment, the bus lines may be arranged symmetrically on both sides of the display area AA. The bus lines may also be arranged on only one side of the display area AA, either the left-right or top-bottom side. At least one of the bus lines may be, as explained with reference to FIG. 6, extended in the non-display area to surround at least three sides of the display area AA.

The arrangement of the shift registers 21 to 25 is not limited to the illustrated configuration. The arrangement of the shift registers 21 to 25 may vary within the possible range depending on the specifications of the display panel 50 to reduce the size of the non-display area and minimize the length and amount of wiring.

Figure 9:
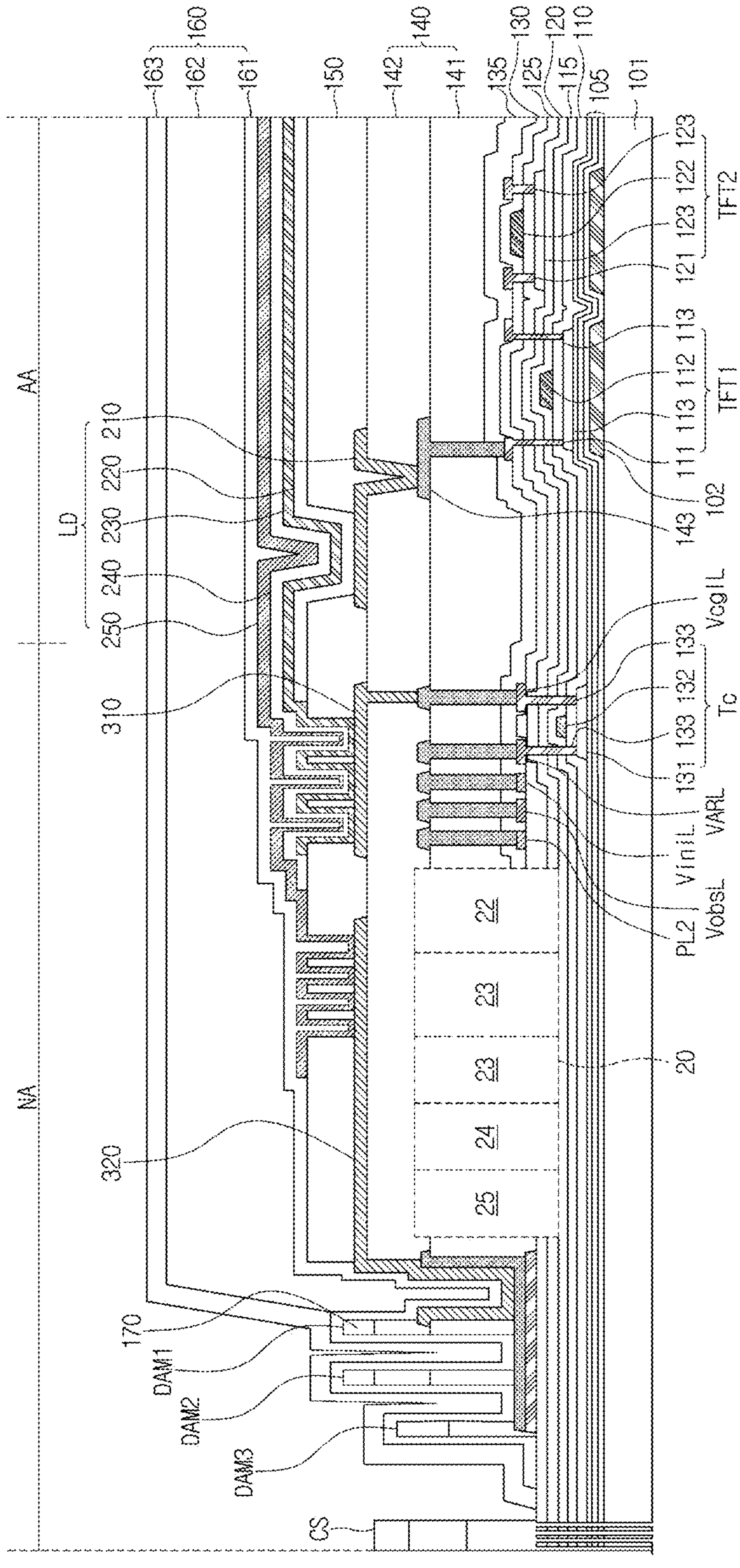
FIG. 9 is a cross-sectional view illustrating the stacked structure of a display device according to an embodiment.

FIG. 9 is a cross-sectional view illustrating the stacked structure of a display device according to an embodiment.

Referring to FIG. 9, the display panel 50 may include a display area AA where the pixels PX are located and a non-display area NA surrounding the display area AA where the driving unit is located. Such a display panel 50 may include a substrate 101, one or more transistors TFT1, TFT2 and light-emitting elements LD arranged on the substrate 101 in the display area AA, one or more driving units, dams DAM1, DAM2, DAM3, and a crack stopper CS arranged on the substrate 101 in the non-display area NA.

The substrate 101 supports the various components of the display panel 50. The substrate 101 may be formed of a transparent dielectric material such as glass, plastic, and the like. In the case of being made of plastic, the substrate 101 may be referred to as a plastic film or a plastic substrate. For example, the substrate 101 may be in the form of a film and include one of a polyimide-based polymer, a polyester-based polymer, a silicone-based polymer, an acrylic-based polymer, a polyolefin-based polymer, and their copolymers, but the embodiments of this specification are not limited to thereto. Additionally, when made of plastic, the substrate 101 may be formed in a double structure. For example, the substrate may be a double structure with an adhesive layer between the first polyimide layer and the second polyimide layer. The substrate may also include an interlayer insulation layer made of an inorganic insulating material between the first polyimide layer and the second polyimide layer.

When the substrate 101 is made of glass, it may be referred to as a glass substrate. For example, the glass substrate may include a shielding metal 102 under the transistors TFT1 and TFT2 to protect against external light or signal interference.

A first buffer layer 105 may be disposed on the substrate 101. The first buffer layer 105 may delay the diffusion of moisture and/or oxygen that may penetrate the substrate 101. The first buffer layer 105 may include inorganic materials such as oxides and nitrides, organic materials, or inorganic-organic composites and may be formed in a single-layer or multi-layer structure. For example, the first buffer layer 105 may have a structure of a triple layer or more, comprising of silicon oxide, silicon nitride, and silicon oxide.

A shielding metal 102 may be formed between the substrate 101 and the first buffer layer 105. The shielding metal 102 may be disposed overlapping one or more of the transistors TFT1, TFT2 to protect the transistors from external light or signal interference.

In the display area AA, transistors TFT1 and TFT2 for driving the light-emitting element LD may be disposed on the substrate 101. The transistors TFT1, TFT2 drive the light-emitting element LD.

For convenience of explanation, among the various transistors that may be included in the display device 1 (FIG. 1), only the driving transistor TFT1 (e.g., driving transistor DT, FIG. 2) and one switching transistor TFT2 (e.g., fourth transistor T4, FIG. 2) are shown in FIG. 9, but the transistors TFT1 and TFT2 are not limited thereto. Hereinafter, an example will be described in which the transistors TFT1 and TFT2 have a coplanar structure, but the transistors TFT1 and TFT2 may also be implemented in other various structures, such as staggered structures.

The first transistor TFT1 may include a semiconductor layer 111, a gate electrode 112, and source and drain electrodes 113 disposed on the first buffer layer 105.

The semiconductor layer 111 may be made of polysilicon (p-Si), and in this case, a specific region may be doped with impurities. Additionally, the semiconductor layer 111 may be composed of amorphous silicon (a-Si) or various organic semiconductor materials such as pentacene. The semiconductor layer 111 may also be composed of an oxide material. The embodiments are not limited to the materials constituting the semiconductor layer 111. The semiconductor layer 111 may be referred to as the active layer.

The semiconductor layer 111 may form a channel during the operation of the first transistor TFT1. The semiconductor layer 111 may include a channel region, a source region, and a drain region. The channel region may be disposed to overlap with the gate electrode 112 and may be formed between the source region and the drain region. The source and drain regions may be connected to the source electrode and drain electrode 113 via contact holes.

The gate electrode 112 may be disposed on top of the semiconductor layer 111, overlapping the channel region of the semiconductor layer 111. The gate electrode 112 may be formed as a single layer or a multilayer of various conductive materials, such as magnesium (Mg), aluminum (Al), nickel (Ni), chromium (Cr), molybdenum (Mo), tungsten (W), gold (Au), or their alloys, but is not limited thereto.

A first insulating layer 110 may be disposed between the semiconductor layer 111 and the gate electrode 112. The first insulating layer 110 may serve as a layer to insulate the semiconductor layer 111 and the gate electrode 112 and may be composed of an insulating material. For example, the first insulating layer 110 may be formed as a single layer or a multilayer of silicon oxide (SiOx) or silicon nitride (SiNx), but is not limited thereto.

The source and drain electrodes 113 are electrically connected to the source and drain regions of the semiconductor layer 111, respectively, and are arranged with a spacing therebetween. The source and drain electrodes 113 may be formed as a single layer or a multilayer of conductive materials, such as copper (Cu), aluminum (Al), molybdenum (Mo), titanium (Ti), or their alloys, but are not limited to these.

At least one insulating layer may be interposed between the source and drain electrodes 113 and the gate electrode 112. For example, a second insulating layer 115, a second buffer layer 120, a third insulating layer 125, and a fourth insulating layer 130 may be interposed between the source and drain electrodes 113. Here, the second insulating layer 115 may be formed to cover the gate electrode 112.

The second transistor TFT2 may include a semiconductor layer 121 disposed on the second buffer layer 120, a gate electrode 122, and source and drain electrodes 123.

The semiconductor layer 121 may be formed from an oxide semiconductor, amorphous silicon (a-Si), polycrystalline silicon (poly-Si), or various organic semiconductors such as pentacene, but is not limited thereto. The semiconductor layer 121 may be referred to as the active layer.

The semiconductor layer 121 may form a channel during the operation of the second transistor TFT2. The semiconductor layer 121 may include a channel region, a source region, and a drain region. The channel region may be disposed to overlap with the gate electrode 122 and may be formed between the source region and the drain region. The source and drain regions may be connected to the source electrode and drain electrode 123 via contact holes.

The gate electrode 122 may be disposed on top of the semiconductor layer 121, overlapping the channel region of the semiconductor layer 121. The gate electrode 122 may be formed as a single layer or a multilayer of various conductive materials, such as magnesium (Mg), aluminum (Al), nickel (Ni), chromium (Cr), molybdenum (Mo), tungsten (W), gold (Au), or their alloys, but is not limited thereto.

A third insulating layer 125 may be disposed between the semiconductor layer 121 and the gate electrode 122. The third insulating layer 125 may be a layer for insulating the semiconductor layer 121 from the gate electrode 122 and may be made of an insulating material. For example, the third insulating layer 125 may be composed of a single or multilayer of silicon oxide (SiOx) or silicon nitride (SiNx), but is not limited thereto.

The source and drain electrodes 123 are electrically connected to the source and drain regions of the semiconductor layer 121, respectively, and are arranged with a spacing therebetween. The source and drain electrodes 123 may be formed as a single layer or a multilayer of conductive materials, such as copper (Cu), aluminum (Al), molybdenum (Mo), titanium (Ti), or their alloys, but are not limited to these.

At least one insulating layer may be interposed between the source and drain electrodes 123 and the gate electrode 122. For example, a second insulating layer 115, a second buffer layer 120, a third insulating layer 125, and a fourth insulating layer 130 may be interposed between the source and drain electrodes 123. The fourth insulating layer 130 may be formed to cover the gate electrode 122.

The insulating layers 110, 115, 125, and 130 may be composed of silicon oxide SiOx, silicon nitride SiNx, or a multilayer thereof.

A protective film 135 and a planarization layer 140 may be formed on the transistors TFT1 and TFT2. The protective film 135 may be composed of silicon oxide SiOx, silicon nitride SiNx, or a multilayer thereof. The planarization layer 140 may be provided to alleviate the step of the lower components. The planarization layer 140 may be made of organic materials such as polyimide, benzocyclobutene series resin, or acrylate. The planarization layer 140 may be formed as a multilayer, as shown in the drawing. In the illustrated embodiment, the planarization layer 140 comprises of two layers 141 and 142, but in various other embodiments, the planarization layer 140 may comprise of three or more layers. One or more conductive layers may be formed between the multilayered planarization layers 140.

For example, a connection electrode 143 may be formed between the first planarization layer 141 and the second planarization layer 142. The connection electrode 143 may be connected to the drain electrode 113 of the transistor TFT1 through a connection electrode contact hole passing through the protective film 135 and the first flattening layer 140. The connection electrode 143 may be made of a material with low resistivity, similar or identical to the drain electrode 113, but is not limited thereto.

In the non-display area NA, driving units may be arranged on the substrate 101. For example, shift registers 21 to 25 constituting the gate driver 20 may be arranged on the substrate 101. The shift registers 21 to 25 may include at least one transistor. The transistors forming the driving unit may be of the same type as at least one of the transistors TFT1 and TFT2 in the display area AA and may be formed in the same layer with the same structure.

Bus lines may also be arranged on the substrate 101. The bus lines may include the low-potential driving voltage line PL2. The low-potential driving voltage line PL2 may be formed in a shape surrounding the outer periphery of the display panel 50. The low-potential driving voltage line PL2 may be located outside the gate driver 20, and at least part of it may overlap with the gate driver 20. The low-potential driving voltage line PL2 may be electrically connected to the cathode electrode 250 extended to the non-display area NA, and the low-potential driving voltage ELVSS (FIG. 1) may be applied to the cathode electrode 250.

The bus lines may further include the high-potential driving voltage line PL1, on-bias voltage line VobsL, initialization voltage line ViniL, anode reset voltage line VARL, and common node reset voltage line VcglL. Some or all of the high-potential driving voltage line PL1, on-bias voltage line VobsL, initialization voltage line ViniL, anode reset voltage line VARL, and common node reset voltage line VcglL may be formed in a shape surrounding the display area AA and located inside the gate driver 20.

The anode reset voltage line VARL and the common node reset voltage line VcglL may be electrically connected through the connection transistor Tc. The connection transistor Tc may be of the same type as at least one of the transistors TFT1 and TFT2 in the display area AA and may be formed in the same layer with the same structure. For example, the connection transistor Tc may include a semiconductor layer 131 disposed on the first buffer layer 105, a gate electrode 132, and source and drain electrodes 133. The gate electrode 132 may be electrically connected to the third scan line GL3 extending from the gate driver 20 through a contact hole or may be formed as a single pattern in the same layer. The source and drain electrodes 133 may be electrically connected to the anode reset voltage line VARL and the common node reset voltage line VcglL through a contact hole or may be formed as a single pattern in the same layer. The structure of the connection transistor Tc is not limited to the illustrated example.

The bus lines may have a dual-wiring structure composed of at least two conductive layers. For example, the bus lines may include a first conductive layer formed in the same layer as the connection electrode 143 and a second conductive layer formed in the same layer as the source and drain electrodes 113 and 123 of the transistors TFT1 and TFT2, where these layers may be electrically connected or at least partially stacked. When the bus lines are configured with dual wiring, the resistance of the bus lines may be reduced, and the driving voltages may be stably supplied.

A light-emitting element LD may be formed on the planarization layer 140 in the display area AA. In one embodiment, the light-emitting element LD may have a tandem structure. In this embodiment, the light-emitting element LD has a stacked structure including an anode electrode 210, a first light-emitting unit 220, a charge generation layer 230, a second light-emitting unit 240, and a cathode electrode 250.

The anode electrode 210 may be connected to the connection electrode 143 through a contact hole. The anode electrode 210 may be connected to the transistor TFT1 through the connection electrode 143.

A bank 150 may be formed on the anode electrode 210. The bank 150 may be arranged to cover a portion of the anode electrode 210, such as an edge, while leaving another portion, such as a central region, exposed. The bank 150 is widely formed on the substrate 101 to extend to the non-display area NA. The region of the anode electrode 210 that is not covered by the bank 150 and remains exposed may be defined as a light-emitting area.

The bank 150 may be formed of an opaque material to prevent optical interference between adjacent pixels. For example, the bank 150 may include a black-based material, such as a light-shielding material composed of at least one of a color pigment (black pigment), black dye, organic black, or carbon (black bank). Alternatively, the bank 150 may be composed of an organic material such as benzocyclobutene resin, polyimide resin, acrylic resin, or a photosensitive polymer, but is not limited thereto. When the bank 150 is composed of a black-based material, it may block external light, thereby further improving the brightness of the display device 1. In this case, the bank 150 may serve to absorb light reflected from its lower part among the external light incident thereon.

In one embodiment, the bank 150 may be configured as a multilayer structure. In this embodiment, some layers of the multilayer structure (e.g., the lower layer) may include a material from the black series, while other layers (e.g., the upper layer) may include a material from the transparent series.

A first light-emitting unit 220 may be formed over the area of the anode electrode 210 that is not covered by the bank 150. The first light-emitting unit 220 may have a structure in which a first hole transport layer, a first light-emitting layer, and a first electron transport layer are stacked.

A charge generation layer 230 may be formed over the first light-emitting unit 220. A second light-emitting unit 240 may be formed over the charge generation layer 230. The second light-emitting unit 240 may have a structure in which a second hole transport layer, a second light-emitting layer, and a second electron transport layer are stacked.

A cathode electrode 250 may be formed over the second light-emitting unit 240. The cathode electrode 250 may be electrically connected to the low-potential driving voltage line (PL2) at the outermost part of the display panel 50 via an auxiliary electrode 320 formed on the same layer as the anode electrode 210 in the non-display area (NA).

The cathode electrode 250, charge generation layer 230, and light-emitting units 220 and 240 may be formed widely on the substrate 101. For example, one or more layers constituting the cathode electrode 250, charge generation layer 230, and light-emitting units 220 and 240 may extend from the display area AA to at least a part of the non-display area NA.

In the non-display area NA, a common node reset electrode 310 may be formed on the planarization layer 140 and the bank 150. The common node reset electrode 310 may be formed on the same layer as the anode electrode 210 in the display area AA. The common node reset electrode 310 may be electrically connected to the charge generation layer 230 extending to the non-display area NA through a contact hole that passes through the bank 150. The common node reset electrode 310 is connected to the common node reset voltage line VcglL through a contact hole passing through the planarization layer 140. Since the common node reset voltage line VcglL is connected to the anode reset voltage line VARL via a connection transistor Tc, the charge generation layer 230 may be electrically connected to the anode reset voltage line VARL through the common node reset electrode 310, the common node reset voltage line VcglL, and the connection transistor Tc.

An encapsulation layer 160 may be formed over the light-emitting element LD. The encapsulation layer 160 may block external moisture or oxygen from penetrating, protecting the light-emitting element LD, which is vulnerable to external moisture or oxygen. To achieve this, the encapsulation layer 160 may include at least one inorganic encapsulation layer and at least one organic encapsulation layer, but this is not limited thereto. Hereinafter, the structure of the encapsulation layer 160, where the first encapsulation layer 161, the second encapsulation layer 162, and the third encapsulation layer 163 are sequentially stacked, will be explained as an example.

The first encapsulation layer 161 is formed on the substrate 101 where the cathode electrode 250 is formed. The third encapsulation layer 163 is formed on the substrate 101 where the second encapsulation layer 162 is formed, and may be configured, along with the first encapsulation layer 161, to surround the top surface, bottom surface, and side surfaces of the second encapsulation layer 162. The first encapsulation layer 161 and the third encapsulation layer 163 may minimize or prevent the penetration of external moisture or oxygen into the light-emitting element LD. The first encapsulation layer 161 and the third encapsulation layer 163 may be formed of inorganic insulating materials, such as silicon nitride (SiNx), silicon oxide (SiOx), silicon oxynitride (SiON), or aluminum oxide (Al2O3), which may be deposited at low temperatures. Since the first encapsulation layer 161 and the third encapsulation layer 163 are deposited in a low-temperature atmosphere, they may prevent damage to the light-emitting element LD, which is vulnerable to high temperatures during the deposition process of the first and third encapsulation layers 161 and 163.

The second encapsulation layer 162 may serve as a buffer to alleviate stress between layers due to the bending of the display device 1 (FIG. 1) and may flatten the step differences between the layers. This second encapsulation layer 162 may be formed of non-photosensitive organic insulating materials, such as acrylic resin, epoxy resin, phenolic resin, polyamide resin, polyimide resin, polyethylene, or silicon oxycarbons SiOC, or photosensitive organic insulating materials, such as photoacrylic, but this is not limited thereto. When the second encapsulation layer 162 is formed through an inkjet method, dams DAM1, DAM2, and DAM3 may be arranged to prevent the liquid form of the second encapsulation layer 162 from spreading to the edge of the substrate 101. The dams DAM1, DAM2, and DAM3 may be positioned closer to the edge of the substrate 101 than the second encapsulation layer 162. That is, the second encapsulation layer 162 may be formed inside the dams DAM1, DAM2, and DAM3. With these dams DAM1, DAM2, and DAM3, the diffusion of the second encapsulation layer 162 into the pad area, where the conductive pad is located at the outermost part of the substrate 101, may be prevented.

The dams DAM1, DAM2, DAM3 are designed to prevent or at least reduce the diffusion of the second encapsulation layer 162. When the second encapsulation layer 162 is formed to exceed the height of the dams DAM1, DAM2, and DAM3 during the process, the organic second encapsulation layer 162 may be exposed to the outside, making it easier for moisture or other substances to penetrate into the light-emitting element. Therefore, to prevent this, the dams DAM1, DAM2, and DAM3 may be formed with at least two layers. The dams DAM1, DAM2, and DAM3 may be provided in two or more layers. In this case, the two or more dams DAM1, DAM2, and DAM3 may be formed with the same or different structures.

The first dam DAM1 may be formed using the same process as the planarization layer 140, the bank 150, and the spacer 170. Here, the planarization layer 140 may be the second planarization layer 142, but is not limited thereto. The spacer 170 may be formed on the bank 150. The spacer 170 may be formed to prevent or at least reduce mask imprinting during the process and may be made of organic insulating materials such as polyimide, polyamide, acrylic resin, benzocyclobutene, hexamethyldisiloxane (HMDSO), and phenolic resin. The first dam DAM1 may have a triple-layer structure comprising of the planarization layer 140, the bank 150, and the spacer 170.

In one embodiment, the auxiliary electrode 320 may extend between the planarization layer 140 and the bank 150 forming the first dam DAM1. The lower part of the first dam DAM1 may contact the low-potential driving voltage line PL2.

The second dam DAM2 may be formed on the outer side of the first dam DAM1 and may have the same structure as the first dam DAM1.

The third dam DAM3 may be formed on the outer side of the second dam DAM2 and may be formed through the same process as the planarization layer 140 and the bank 150. Here, the planarization layer 140 may be the second planarization layer 142, but is not limited thereto. The third dam DAM3 may have a dual-layer structure comprising of the planarization layer 140 and the bank 150. The lower part of the third dam DAM3 may contact at least one area of the low-potential driving voltage line PL2, with the remaining area possibly contacting the fourth insulating layer 130.

The first encapsulation layer 161 and the third encapsulation layer 163 may extend beyond the dams DAM1, DAM2, and DAM3 to the outer edge of the substrate 101.

At the outermost edge of the substrate 101, a crack stopper CS may be further formed. The crack stopper CS prevents or at least reduces cracks that may occur in the substrate 101 from being transmitted inward due to external forces. The crack stopper CS may prevent or at least reduce the entire substrate 101 from being damaged due to cracks that may occur when the substrate 101 is separated from a mother substrate.

The crack stopper CS may be formed using the same process as the planarization layer 140, the bank 150, and the spacer 170. Here, the planarization layer 140 may be the second planarization layer 142, but is not limited thereto. At the bottom of the crack stopper CS, the first buffer layer 105, the first insulating layer 110, the second insulating layer 115, the second buffer layer 120, the third insulating layer 125, and the fourth insulating layer 130 may include at least one groove. The planarization layer 140 may be formed to fill the inner layer of the groove.

On the encapsulation layer 160, a touch layer, a color filter layer, and one or more optical function layers may further be disposed. For example, the touch layer may include a touch electrode or a touch sensor electrode in the display area AA. The touch electrode or touch sensor electrode may have a mesh shape. For example, the touch layer may include a touch wiring or touch routing line in the non-display area NA. The touch wiring or touch routing line may be located between the dams DAM1, DAM2, and DAM3 and the display area AA. For example, the touch wiring or touch routing line may be positioned in an area overlapping the gate driver 20.

Figure 10:
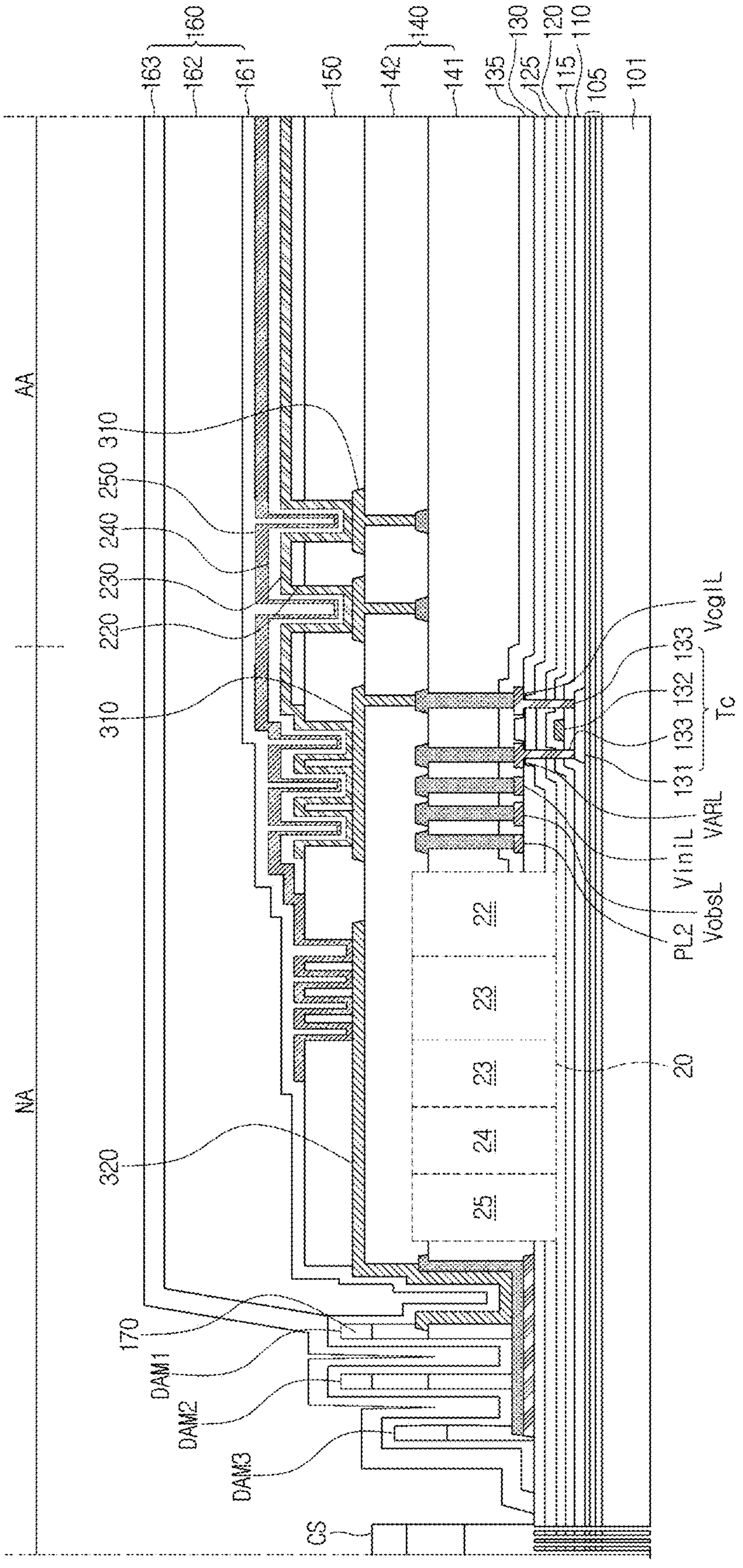
FIG. 10 is a cross-sectional view illustrating the stacked structure of a display device according to another embodiment.

FIG. 10 is a cross-sectional view illustrating the stacked structure of a display device according to another embodiment.

Compared to the embodiment of FIG. 9, in the embodiment of FIG. 10, the common node reset electrode 310 is formed not only in the non-display area NA but also in the display area AA. In this embodiment, the common node reset electrode 310 may include one or more contact regions in the display area AA, which connect to the charge generation layer 230 and the common node reset voltage line VcglL.

In the contact region, the common node reset electrode 310 may be connected to the charge generation layer 230 through a contact hole passing through the bank 150.

In the contact region, the common node reset voltage line VcglL, patterned below the common node reset electrode 310, may be formed to overlap. The common node reset voltage line VcglL may be formed in the same layer as the source and drain electrodes 123, but this is not limited thereto.

In the contact region, the common node reset electrode 310 may be connected to the node reset voltage line VcglL through a contact hole passing through the planarization layer 140.

The contact region may be formed as one or more for each pixel PX, or the contact region may be formed as one or more for multiple pixels. For example, the contact region may be formed for every 3×3 pixel unit or 5×5 pixel unit.

Since the common node reset electrode 310 in the display area AA is connected to the node reset voltage line VcglL through the contact region, the uniformity of the common node reset voltage Vcgl applied to the charge generation layer 230 via the common node reset electrode 310 is improved.

Figure 11:
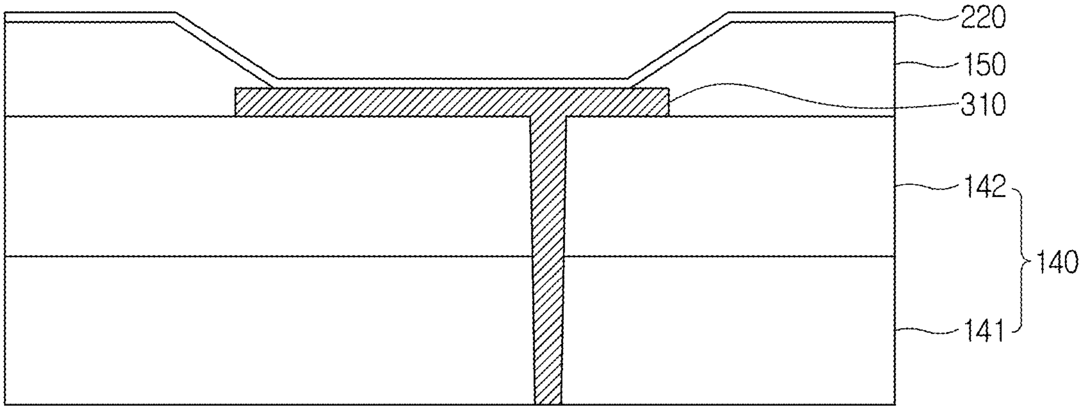
FIGS. 11 to 13 are diagrams illustrating a method of forming the contact region shown in FIG. 10 according to an embodiment.
Figure 12:
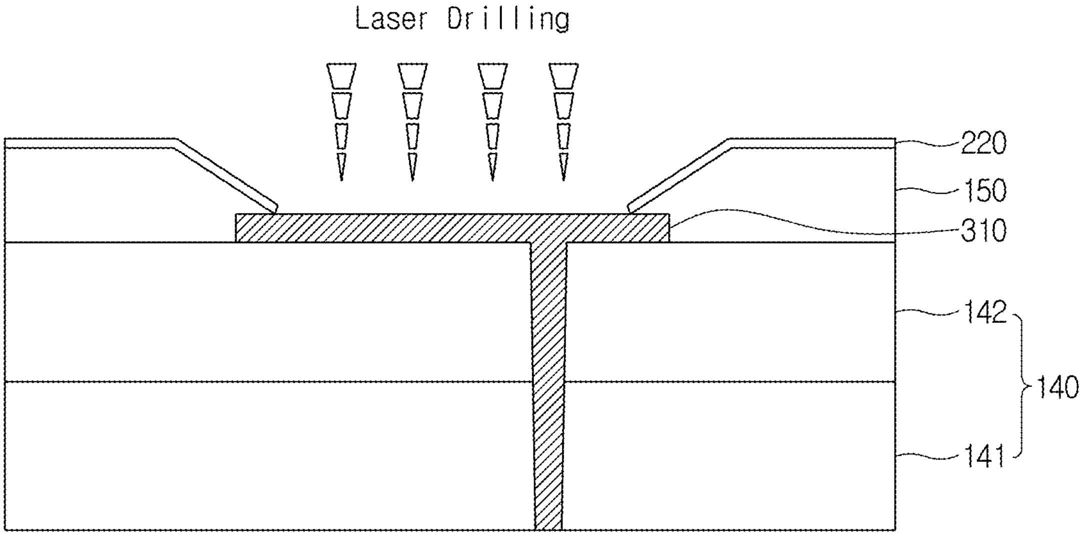
Figure 13:
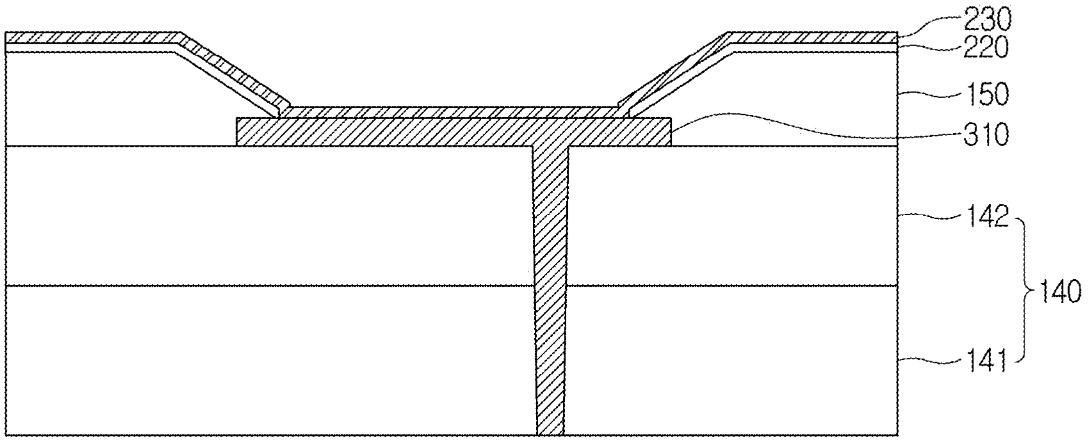

FIGS. 11 to 13 are diagrams illustrating a method of forming the contact region shown in FIG. 10 according to one embodiment.

Referring to both FIG. 10 and FIG. 11, a planarization layer 140, including the first planarization layer 141 and the second planarization layer 142, is formed on the substrate 101. The common node reset electrode 310 may be formed along with the anode electrode 210 on the planarization layer 140.

The bank 150 may be formed on the common node reset electrode 310. The bank 150 may be formed so as not to cover at least a portion of the common node reset electrode 310 in the contact region.

On the common node reset electrode 310 that is not covered by the bank 150 and is exposed on top, the first light-emitting unit 220 may be formed. For example, the first hole transport layer, the first light-emitting layer, and the first electron transport layer may be sequentially formed.

Referring to both FIG. 10 and FIG. 12, a laser drilling or laser etching process may be performed on the first light-emitting unit 220 in the contact region. Through laser drilling or laser etching, a hole may be formed in the first light-emitting unit 220. The common node reset electrode 310 formed beneath the first light-emitting unit 220 will not be etched by the laser and may be exposed to the top through the hole formed in the first light-emitting unit 220.

Referring to both FIG. 10 and FIG. 13, a charge generation layer 230 is formed on the first light-emitting unit 220. The charge generation layer 230 may directly contact the common node reset electrode 310, which is exposed through the hole in the first light-emitting unit 220.

The display device according to the embodiments is advantageous for addressing the issue where, during an anode reset period within one frame, the common node is left floating, causing voltage fluctuations and resulting in variations in electroluminescent characteristics.

The display device according to the embodiments is advantageous for preventing voltage fluctuations in the common node by resetting the voltage of the common node during the anode reset period.

The display device according to the embodiments is advantageous for minimizing current leakage by utilizing an oxide semiconductor transistor.

Although embodiments of this invention have been described above with reference to the accompanying drawings, it will be understood that the technical configuration of this invention described above can be implemented in other specific forms by those skilled in the art without changing the technical concept or essential features of the present invention. Therefore, it should be understood that the embodiments described above are exemplary and not limited in all respects. Furthermore, the scope of the present invention is defined by the claims set forth below, rather than the detailed description above. In addition, it should be understood that all modifications or variations derived from the meaning and scope of the claims and their equivalent concept are included within the scope of this invention.

What is claimed is:

1. A display device comprising:

pixels in a display area; and at least one driving unit in a non-display area that surrounds the display area, wherein each of the pixels comprises:

a light-emitting element comprising a plurality of light-emitting units connected in series through a common node;

a driving transistor comprising a first electrode connected to a high-potential driving voltage line through a first node, a second electrode connected to a second node, and a gate electrode connected to an anode electrode of the light-emitting element through a third node;

a compensation transistor connected between the second node and the third node, the compensation transistor having a gate electrode configured to receive a first scan signal;

a switching transistor connected between a data line and the first node, the switching transistor having a gate electrode configured to receive a second scan signal;

an anode reset transistor connected between the light-emitting element and an anode reset voltage line, the anode reset transistor having a gate electrode configured to receive a third scan signal; and a common node reset voltage line connected to the common node, wherein the common node reset voltage line is electrically connected to the anode reset voltage line through a connection transistor, and wherein the connection transistor is connected between the anode reset voltage line and the common node reset voltage line, the connection transistor having a gate electrode configured to receive the third scan signal.

2. The display device of claim 1, wherein, when the third scan signal is applied at a turn-on level during an anode reset period within one frame, the anode reset transistor is turned on and applies an anode reset voltage to the anode electrode, the connection transistor is turned on and electrically connects the anode reset voltage line and the common node reset voltage line, and the common node reset voltage line applies the anode reset voltage to the common node.

3. The display device of claim 1, wherein the connection transistor is in the non-display area.

4. The display device of claim 3, wherein the anode reset voltage line and the common node reset voltage line are between the at least one driving unit and the display area, and the connection transistor is in a connection area between the anode reset voltage line and the common node reset voltage line.

5. The display device of claim 1, wherein the common node reset voltage line has a closed-loop shape that surrounds the display area, and the anode reset voltage line surrounds at least three sides of the display area.

6. The display device of claim 1, wherein the light-emitting element comprises:

a first electrode;

a second electrode arranged opposite the first electrode;

a first light-emitting unit and a second light-emitting unit between the first electrode and the second electrode; and a charge generation layer interposed between the first light-emitting unit and the second light-emitting unit, the charge generation layer constituting the common node.

7. The display device of claim 1, wherein each of the pixels further comprises:

an initialization transistor connected between an initialization voltage line and the second node, the initialization transistor having a gate electrode configured to receive a fourth scan signal;

a first light-emission transistor connected between the high-potential driving voltage line and the first node, the first light-emission transistor having a gate electrode configured to receive a light-emission signal;

a second light-emission transistor connected between the third node and the light-emitting element, the second light-emission transistor having a gate electrode configured to receive the light-emission signal;

an on-bias transistor connected between the first node and an on-bias voltage line, the on-bias transistor having a gate electrode configured to receive the second scan signal; and a storage capacitor connected between the high-potential driving voltage line and the second node.

8. The display device of claim 7, wherein the at least one driving unit comprises:

a gate driver configured to output the first scan signal to the fourth scan signal and the light-emission signal through corresponding scan lines and a light-emission line, respectively, wherein the gate driver comprises:

a first shift register configured to output the first scan signal;

a second shift register configured to output the second scan signal;

a third shift register configured to output the third scan signal;

a fourth shift register configured to output the fourth scan signal; and a fifth shift register configured to output the light-emission signal, wherein the second shift register is adjacent to the display area, and wherein the first shift register, the third shift register, the fourth shift register, and the fifth shift register are sequentially disposed farther from the display area.

9. The display device of claim 1, wherein at least some of the driving transistor, the compensation transistor, and the anode reset transistor are low temperature poly-silicon (LTPS) transistors, and remaining transistors are oxide transistors.

10. A display device, comprising:

pixels in a display area;

at least one driving unit in a non-display area that surrounds the display area, wherein each of the pixels comprises:

a light-emitting element comprising a plurality of light-emitting units connected in series through a common node;

a driving transistor comprising a first electrode connected to a high-potential driving voltage line through a first node, a second electrode connected to a second node, and a gate electrode connected to an anode electrode of the light-emitting element through a third node;

a compensation transistor connected between the second node and the third node, the compensation transistor having a gate electrode configured to receive a first scan signal;

a switching transistor connected between a data line and the first node, the switching transistor having a gate electrode configured to receive a second scan signal;

an anode reset transistor connected between the light-emitting element and an anode reset voltage line, the anode reset transistor having a gate electrode configured to receive a third scan signal; and a common node reset voltage line connected to the common node;

a substrate;

a first buffer layer on the substrate;

a first semiconductor layer of a first transistor on the first buffer layer;

a first insulating layer on the first semiconductor layer;

a first gate electrode of the first transistor on the first insulating layer;

a second insulating layer on the gate electrode of the first transistor;

a second buffer layer on the second insulating layer;

a second semiconductor layer of a second transistor on the second buffer layer;

a third insulating layer on the second semiconductor layer;

a second gate electrode of the second transistor on the third insulating layer;

a fourth insulating layer on the second gate electrode of the second transistor;

source and drain electrodes of the first transistor and the second transistor on the fourth insulating layer;

a protective film on the source and drain electrodes;

a planarization layer on the protective film;

an anode electrode of the light-emitting element on the planarization layer;

a first light-emitting unit of the plurality of light-emitting units on the anode electrode;

a charge generation layer of the light-emitting element on the first light-emitting unit, constituting the common node;

a second light-emitting unit of the plurality of light-emitting units on the charge generation layer; and a cathode electrode of the light-emitting element on the second light-emitting unit, wherein the first transistor is one of the driving transistor, the compensation transistor, or the anode reset transistor, and the second transistor is another of the driving transistor, the compensation transistor, or the anode reset transistor.

11. The display device of claim 10, further comprising a connection transistor including:

a third semiconductor layer on the first buffer layer;

a gate electrode on the first insulating layer; and a third source electrode and a third drain electrode on the fourth insulating layer, wherein the third source electrode is connected to the anode reset voltage line, and the third drain electrode is connected to the common node reset voltage line.

12. The display device of claim 11, further comprising:

a common node reset electrode on the planarization layer in the non-display area, wherein the common node reset electrode is connected to the charge generation layer and the common node reset voltage line through a contact hole.

13. The display device of claim 12, wherein the common node reset electrode is further disposed in the display area and is connected to the charge generation layer and the common node reset voltage line through at least one contact hole in the display area.

14. A display device comprising:

a substrate including a display area and a non-display area;

a first buffer layer on the substrate;

a first semiconductor layer of a first transistor on the first buffer layer in the display area;

a first insulating layer on the first semiconductor layer;

a first gate electrode of the first transistor on the first insulating layer in the display area;

a second insulating layer on the first gate electrode of the first transistor;

a second buffer layer on the second insulating layer;

a second semiconductor layer of a second transistor on the second buffer layer in the display area;

a third insulating layer on the second semiconductor layer;

a second gate electrode of the second transistor on the third insulating layer in the display area;

a fourth insulating layer on the second gate electrode of the second transistor;

source and drain electrodes of the first transistor and the second transistor on the fourth insulating layer in the display area;

a protective film on the source and drain electrodes;

a planarization layer on the protective film;

an anode electrode of a light-emitting element on the planarization layer in the display area;

a first light-emitting unit of the light-emitting element on the anode electrode;

a charge generation layer of the light-emitting element on the first light-emitting unit, constituting a common node;

a second light-emitting unit of the light-emitting element on the charge generation layer; and a cathode electrode of the light-emitting element on the second light-emitting unit.

15. The display device of claim 14, further comprising a connection transistor in the non-display area, the connection transistor including:

a third semiconductor layer on the first buffer layer;

a gate electrode on the first insulating layer; and a third source electrode and a third drain electrode on the fourth insulating layer, wherein the third source electrode is connected to an anode reset voltage line, and the third drain electrode is connected to a common node reset voltage line.

16. The display device of claim 15, further comprising:

a common node reset electrode on the planarization layer in the non-display area, wherein the common node reset electrode is connected to the common node reset voltage line through a contact hole, and the charge generation layer extends from the display area to the non-display area and is connected to the common node reset electrode through a contact hole in the non-display area.

17. The display device of claim 16, wherein the common node reset electrode is further disposed in the display area and is connected to the charge generation layer and the common node reset voltage line through at least one contact hole in the display area.

18. The display device of claim 15, wherein the planarization layer comprises a first planarization layer and a second planarization layer on the first planarization layer, and the common node reset voltage line and the anode reset voltage line comprise a first conductive layer on the first planarization layer and a second conductive layer on the fourth insulating layer and connected to the first conductive layer through a contact hole.

* * * * *